US012675445B1

(12) United States Patent
Gu et al.

(10) Patent No.: US 12,675,445 B1
(45) Date of Patent: Jul. 7, 2026

(54) SCHEMA GENERATION FOR OPERATIONAL DATA GOVERNANCE

(71) Applicant: Zoom Communications, Inc., San Jose, CA (US)

(72) Inventors: Xingrui Gu, Hefei (CN); Shenghua Li, Hefei (CN); Xu Hua Li, San Jose, CA (US); Chao Ma, Hefei (CN); Tengteng She, Hefei (CN); Chao Wang, Hefei (CN); Hanqing Zhao, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 19/040,488

(22) Filed: Jan. 29, 2025

(51) Int. Cl.
| | |
|---|---|
| *G06F 16/21* | (2019.01) |
| *G06F 16/2452* | (2019.01) |
| *G06F 16/25* | (2019.01) |

(52) U.S. Cl.
CPC ...... *G06F 16/211* (2019.01); *G06F 16/24528* (2019.01); *G06F 16/252* (2019.01)

(58) Field of Classification Search
CPC . G06F 16/211; G06F 16/24528; G06F 16/252
USPC ........................................................ 707/803
See application file for complete search history.

(56) References Cited

U.S. PATENT DOCUMENTS

| | | | |
|---|---|---|---|
| 9,262,519 B1 | 2/2016 | Saurabh et al. | |
| 11,422,880 B1 * | 8/2022 | A ........................ | G06F 11/3688 |

| | | | | |
|---|---|---|---|---|
| 2006/0190497 A1 * | 8/2006 | Inturi | .................... | G06F 16/213 |
| 2009/0037391 A1 | 2/2009 | Agrawal et al. | | |
| 2010/0131565 A1 * | 5/2010 | Weinberg | .............. | G06F 16/288 |
| | | | | 707/802 |
| 2015/0339359 A1 | 11/2015 | Takaoka et al. | | |
| 2016/0210468 A1 * | 7/2016 | Turner | ................ | G06F 21/6218 |
| 2017/0262360 A1 * | 9/2017 | Kochura | .............. | G06F 40/279 |
| 2020/0409970 A1 | 12/2020 | Dhayanithi | | |
| 2022/0035841 A1 | 2/2022 | Beahan, Jr. et al. | | |
| 2022/0159041 A1 | 5/2022 | Barday et al. | | |
| 2022/0237101 A1 * | 7/2022 | Singh | .................. | G06F 11/3438 |
| 2023/0169360 A1 * | 6/2023 | Busany | .................. | G06N 5/022 |
| | | | | 706/46 |
| 2023/0229639 A1 * | 7/2023 | McCreary | ................ | G06N 3/09 |
| | | | | 707/756 |

OTHER PUBLICATIONS

Stack Overflow, Tool to generate JSON schema from JSON data [closed], <https://stackoverflow.com/questions/7341537/tool-to-generate-json-schema-from-json-data> Retrieved from internet Jan. 23, 2025, 7 pages.

* cited by examiner

*Primary Examiner* — Baoquoc N To

(74) *Attorney, Agent, or Firm* — Young Basile Hanlon & MacFarlane, P.C.

(57) ABSTRACT

A metadata management service receives operational data generated by operations of a computer system is received. The operational data is analyzed to identify data structures within the operational data. A schema definition that represents the operational data in a standardized format is generated based on the data structures. The schema definition is integrated into the metadata management service.

20 Claims, 22 Drawing Sheets

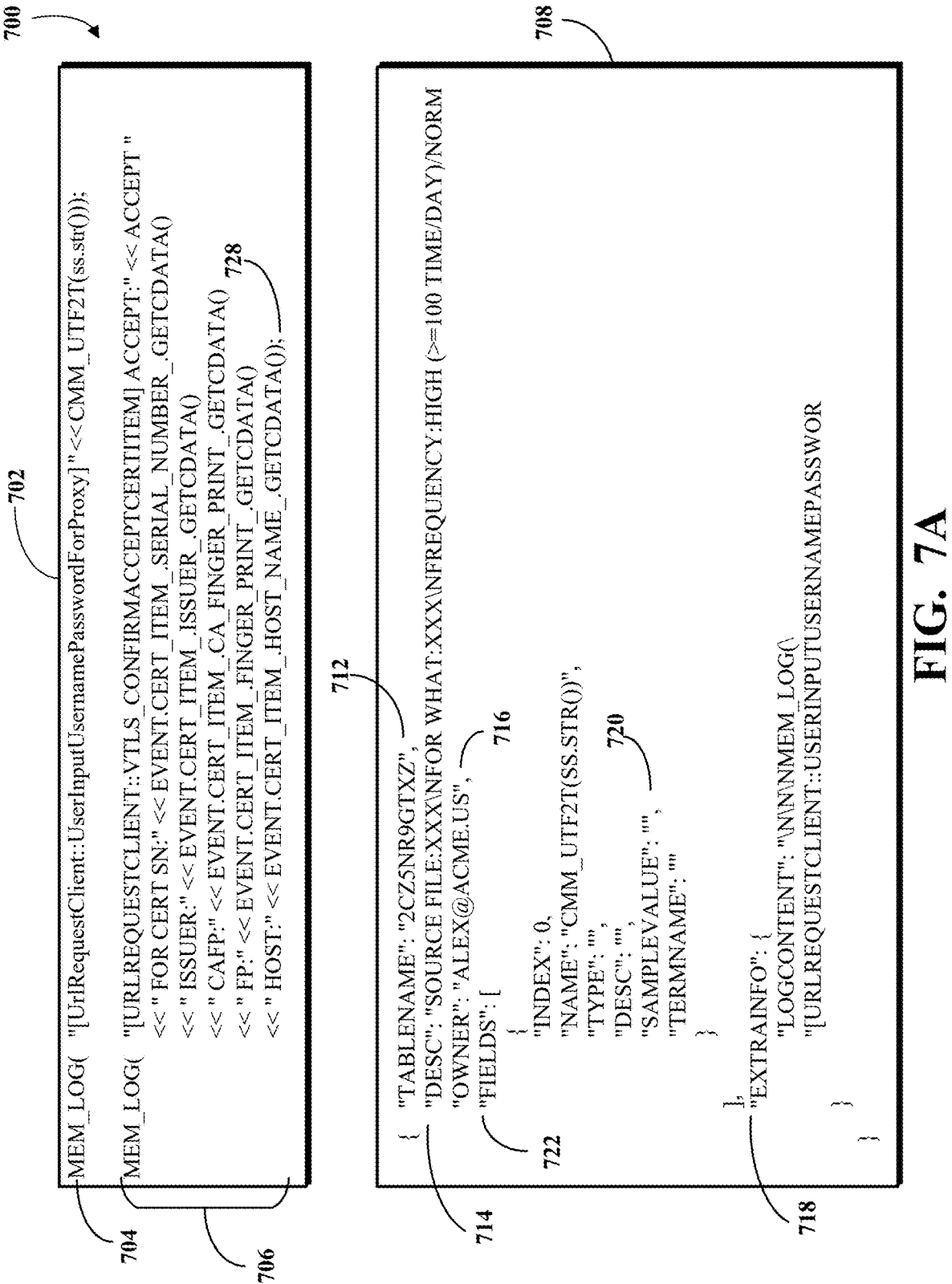

```
MEM_LOG( "[UrlRequestClient::UserInputUsernamePasswordForProxy]" << CMM_UTF2T(ss.str()));

MEM_LOG( "[URLREQUESTCLIENT::VTLS_CONFIRMACCEPTCERT:ITEM] ACCEPT:" << ACCEPT "
    << " FOR CERT SN:" << EVENT.CERT_ITEM_.SERIAL_NUMBER_.GETCDATA()
    << " ISSUER:" << EVENT.CERT_ITEM_.ISSUER_.GETCDATA()
    << " CAFP:" << EVENT.CERT_ITEM_.CA_FINGER_PRINT_.GETCDATA()
    << " FP:" << EVENT.CERT_ITEM_.FINGER_PRINT_.GETCDATA()
    << " HOST:" << EVENT.CERT_ITEM_.HOST_NAME_.GETCDATA());
```

```
{
    "TABLENAME": "2CZ5NR9GTXZ",
    "DESC": "SOURCE FILE:XXX\nFOR WHAT:XXX\nFREQUENCY:HIGH (>=100 TIME/DAY)\NORM
    "OWNER": "ALEX@ACME.US",
    "FIELDS": [
        {
            "INDEX": 0,
            "NAME": "CMM_UTF2T(SS.STR())",
            "TYPE": "",
            "DESC": "",
            "SAMPLEVALUE": "",
            "TERMNAME": ""
        }
    ],
    "EXTRAINFO": {
        "LOGCONTENT": "\N\N\NMEM_LOG(
        "[URLREQUESTCLIENT::USERINPUTUSERNAMEPASSWOR
    }
}
```

```
{
    "TABLENAME": "2CZ5NR9GTXA",
    "DESC": "SOURCE FILE:XXX\NFOR WHAT:XXX\NFREQUENCY:
          HIGH (>=100 TIME/DAY)/NORM",
    "OWNER": "ALEX@ACME.US",
    "FIELDS": [
        {
            "INDEX": 0,
            "NAME": "ACCEPT",
            "TYPE": "",
            "DESC": "",
            "SAMPLEVALUE": "",
            "TERMNAME": ""
        },
        {

"INDEX": 1,
            "NAME": "EVENT.CERT_ITEM_.SERIAL_NUMBER_.GETCDATA()",
            "TYPE": "",
            "DESC": "",
            "SAMPLEVALUE": "",
            "TERMNAME": ""
        },
        {

"INDEX": 2 //....(DATA OMITTED FOR BREVITY)
        },
        {

"INDEX": 5,
            "NAME": "EVENT.CERT_ITEM_.HOST_NAME_.GETCDATA()",
            "TYPE": "",
            "DESC": "",
            "SAMPLEVALUE": "",
            "TERMNAME": ""
        }
    ],
    "EXTRAINFO": {
        "LOGCONTENT": "\N\N\NMEM_LOG(\
                "[URLREQUESTCLIENT::VTLS_CONFIRMACCEPTCERTIT
    }
}
```

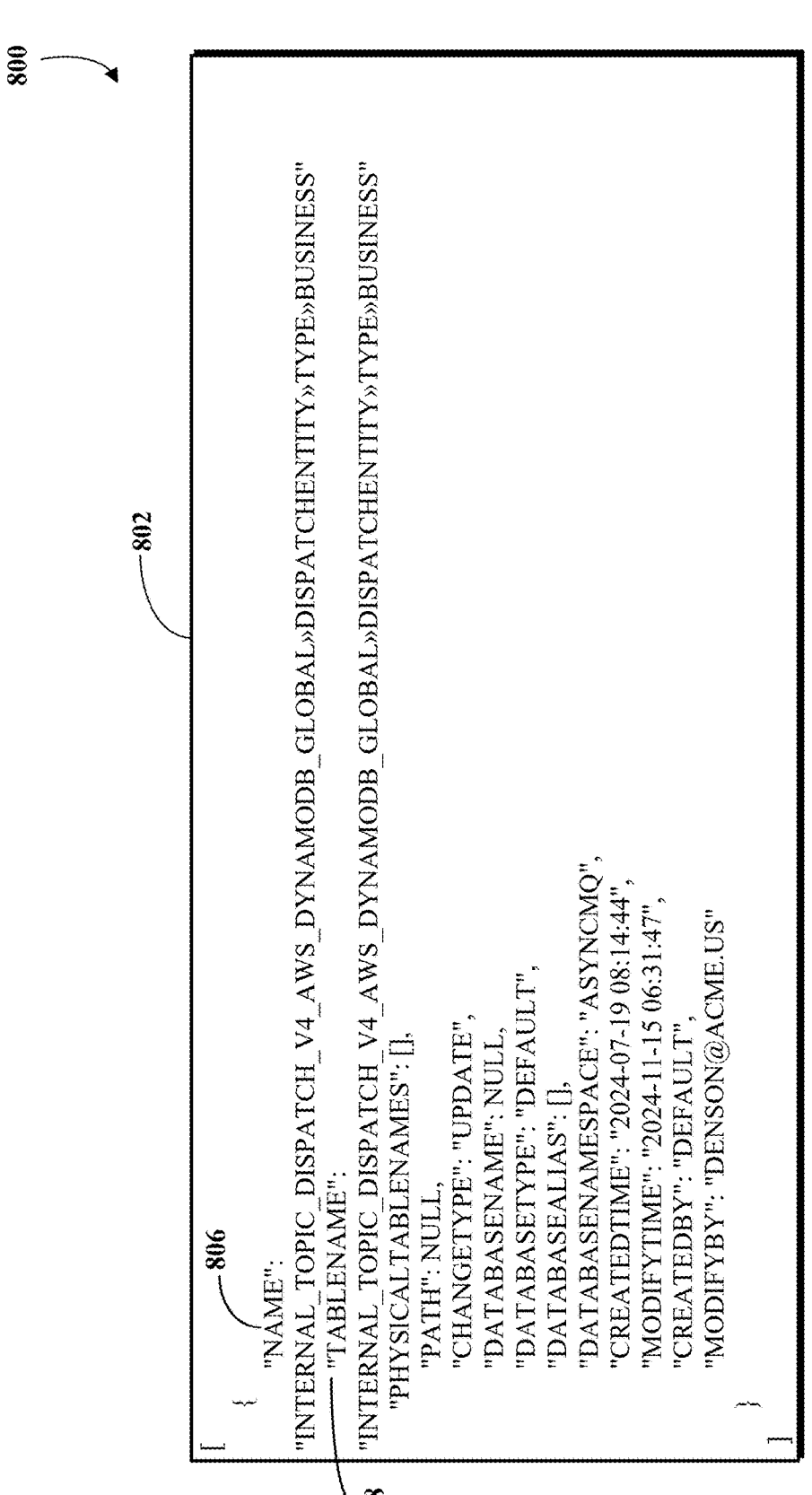

FIG. 8A

```
[
  {
    "NAME":
    "INTERNAL_TOPIC_DISPATCH_V4_AWS_DYNAMODB_GLOBAL»DISPATCHENTITY»TYPE»BUSINESS"
    "TABLENAME":
    "INTERNAL_TOPIC_DISPATCH_V4_AWS_DYNAMODB_GLOBAL»DISPATCHENTITY»TYPE»BUSINESS"
    "PHYSICALTABLENAMES": [],
    "PATH": NULL,
    "CHANGETYPE": "UPDATE",
    "DATABASENAME": NULL,
    "DATABASETYPE": "DEFAULT",
    "DATABASEALIAS": [],
    "DATABASENAMESPACE": "ASYNCMQ",
    "CREATEDTIME": "2024-07-19 08:14:44",
    "MODIFYTIME": "2024-11-15 06:31:47",
    "CREATEDBY": "DEFAULT",
    "MODIFYBY": "DENSON@ACME.US"
  }
]
```

800 ⟍    ⟋804

```
[
    {
              ⟋810
        "TABLENAME": "US_ZDCA-LSS-MONITOR-
DEV_DEV»MMRLOG»MESSAGE[3]»
                    EDGE-WORKER-STATS
        "DESC": "",
        "OWNER": "ALEX@ACME.US",
        "FIELDS": [
            {
                "INDEX": 0,
                "NAME": "TIMESTAMP",
                "TYPE": "DATE",
                "DESC": "",
                "SAMPLEVALUE": "11/11/2024 07:42:31:831",
                "TERMNAME": ""
            }
            {
                "INDEX": 1,
                "NAME": "REPORT_TIME",
                "TYPE": "NUMBER",
                "DESC": "",
                "SAMPLEVALUE": "11/11/2024 07:42:31:831",
                "TERMNAME": ""
            },
            {
                "INDEX": 2,
                "NAME": "MESSAGE.MESSAGE_ID",
                "ALIAS": "MESSAGE_ID",
                "TYPE": "NUMBER",
                "DESC": "",
                "ALIAS": "JSON",
                "SAMPLEVALUE": "1E33061A-47FD-4C54-8A55-645CAF511BDD",
                "TERMNAME": ""
            },
        ],
        "EXTRAINFO": {
            "MESSAGE": ",11/11/2024 07:42:31:831,1E33061A-47FD-4C54-8A55-
645CAF511BDD
        }
    }
]
```

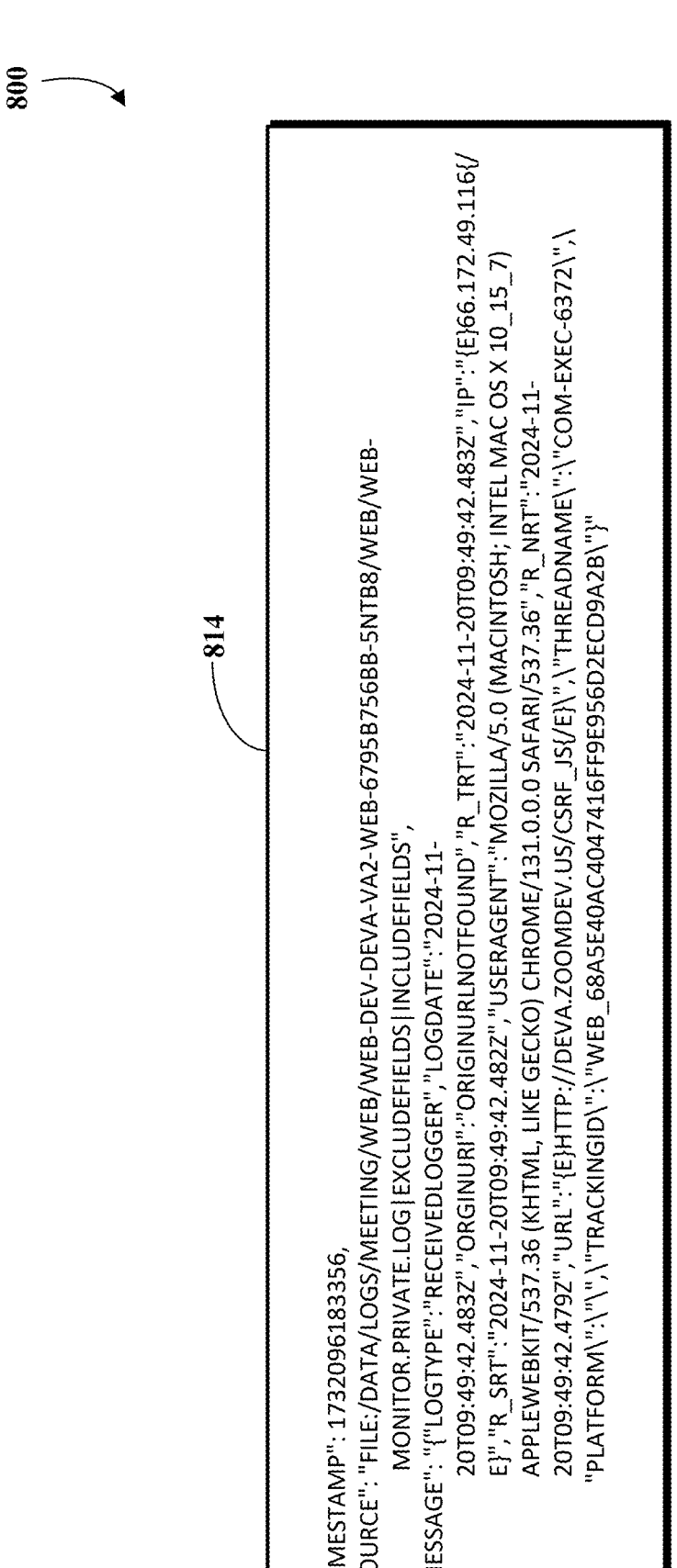

{
"TIMESTAMP": 1732096183356,
"SOURCE": "FILE:/DATA/LOGS/MEETING/WEB/WEB-DEV-DEVA-VA2-WEB-6795B756BB-5NTB8/WEB/WEB-MONITOR.PRIVATE.LOG|EXCLUDEFIELDS|INCLUDEFIELDS",
"MESSAGE": "{"LOGTYPE":"RECEIVEDLOGGER","LOGDATE":"2024-11-20T09:49:42.483Z","ORGINURI":"ORIGINURLNOTFOUND","R_TRT":"2024-11-20T09:49:42.483Z","IP":"{E}66.172.49.116{/E}","R_SRT":"2024-11-20T09:49:42.482Z","USERAGENT":"MOZILLA/5.0 (MACINTOSH; INTEL MAC OS X 10_15_7) APPLEWEBKIT/537.36 (KHTML, LIKE GECKO) CHROME/131.0.0.0 SAFARI/537.36","R_NRT":"2024-11-20T09:49:42.479Z","URL":"{E}HTTP://DEVA.ZOOMDEV.US/CSRF_JS{/E}\",\"THREADNAME\":\"COM-EXEC-6372\",\"PLATFORM\":\"\",\"TRACKINGID\":\"WEB_68A5E40AC4047416FF9E956D2ECD9A2B\"}"
}

```
[
  {
    "TABLENAME": "US_ZDCA-LSS-MONITOR-DEV_DEV»MMRLOG»MESSAGE[3]»EDGE-WORKER-
STATS",
    "DESC": "",
    "OWNER": "CHERYL@ACME.US",
    "FIELDS": [
      {
        "INDEX": 1,
        "NAME": "MESSAGE[1]",
        "ALIAS": "REPORT_TIME",
        "TYPE": "NUMBER",
        "DESC": "",
        "SAMPLEVALUE": "11/11/2024 07:42:31:831",
        "TERMNAME": ""
      },
      {
        "INDEX": 2,
        "NAME": "MESSAGE[2]",
        "ALIAS": "MESSAGE_ID",
        "TYPE": "NUMBER",
        "DESC": "",
        "ALIAS": "JSON",
        "SAMPLEVALUE": "1E33061A-47FD-4C54-8A55-645CAF511BDD",
        "TERMNAME": ""
      },
      {
        "INDEX": 0,
        "NAME": "TIMESTAMP",
        "TYPE": "DATE",
        "DESC": "",
        "SAMPLEVALUE": "11/11/2024 07:42:31:831",
        "TERMNAME": ""
      }
    ],
    "EXTRAINFO": {
      "MESSAGE": ",11/11/2024 07:42:31:831,1E33061A-47FD-4C54-8A55-645CAF511BDD,MMR-
REGIONS,IN-1#,,,,,,,,,,,,,,,"
    }
  }

```
CREATE TABLE `DAS_USER` (
  `USER_ID` VARCHAR(36) COLLATE UTF8MB4_GENERAL_CI NOT NULL,
  `ACCOUNT_ID` VARCHAR(36) COLLATE UTF8MB4_GENERAL_CI NOT NULL,
  `DISPLAY_NAME` VARCHAR(128) COLLATE UTF8MB4_GENERAL_CI NOT NULL,
  `EMAIL` VARCHAR(256) COLLATE UTF8MB4_GENERAL_CI DEFAULT '',
  `AVATAR` VARCHAR(1024) COLLATE UTF8MB4_GENERAL_CI DEFAULT NULL,
  `CREATE_TIME` DATETIME NOT NULL,
  `MODIFY_TIME` DATETIME NOT NULL,
  PRIMARY KEY (`USER_ID`),
  KEY `ACCOUNT_INDEX` (`ACCOUNT_ID`),
  KEY `EMAIL_INDEX` (`EMAIL`),
  KEY `INDEX_CREATE_TIME` (`CREATE_TIME`),
  KEY `IDX_MODIFY_TIME` (`MODIFY_TIME`)
)
```

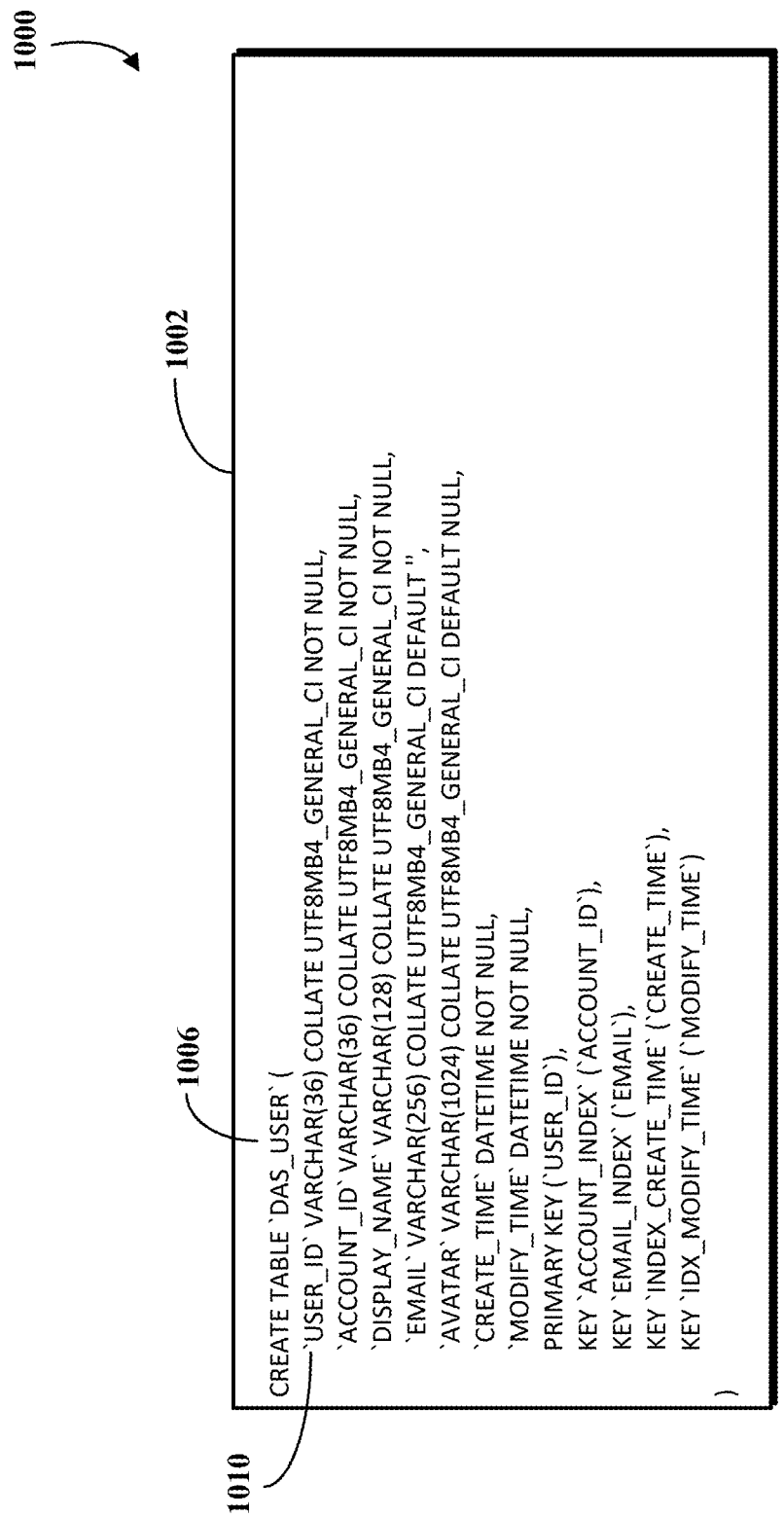

```
{
  "TABLENAME": "DAS_USER",
  "DESC": "",
  "OWNER": "CURRENT.USER@ACME.US",
  "FIELDS": [
    {
      "INDEX": 1,
      "NAME": "USER_ID",
      "TYPE": "STRING",
      "DESC": "",
      "SAMPLEVALUE": "",
      "TERMNAME": "",
      "CONSTRAINTS": ["NOT NULL", "PRIMARY KEY"],
      "LENGTH": 36,
      "COLLATION": "UTF8MB4_GENERAL_CI"
    },
    {
      "INDEX": 2,
      "NAME": "MESSAGE.MESSAGE_ID",
      "ALIAS": "MESSAGE_ID",
      "TYPE": "NUMBER",
      "DESC": "",
      "ALIAS": "JSON",
      "SAMPLEVALUE": "1E33061A-47FD-4C54-8A55-645CAF511BDD",
      "TERMNAME": ""
    },
    { "INDEX": 3, "NAME": "DISPLAY_NAME", "TYPE": "STRING", . . . },
    { "INDEX": 4, "NAME": "EMAIL", "TYPE": "STRING", . . . },
    { "INDEX": 5, "NAME": "AVATAR", "TYPE": "STRING", ... },
    { "INDEX": 6, "NAME": "CREATE_TIME", "TYPE": "DATETIME", . . . },
    { "INDEX": 7, "NAME": "MODIFY_TIME", . . . }
  ],
  "EXTRAINFO": {
    "INDEXES": [
        { "NAME": "ACCOUNT_INDEX",  "COLUMNS": ["ACCOUNT_ID"] },
        { "NAME": "EMAIL_INDEX",       "COLUMNS": ["EMAIL"]     },
        { "NAME": "INDEX_CREATE_TIME", "COLUMNS": ["CREATE_TIME"] },
        { "NAME": "IDX_MODIFY_TIME", "COLUMNS": ["MODIFY_TIME"] }
    ],
    "ORIGINALDDL": "CREATE TABLE `DAS_USER` ( `USER_ID` VARCHAR(36) COLLATE
UTF8MB4_GENERAL_CI NOT NULL, ..."
  }
}
```

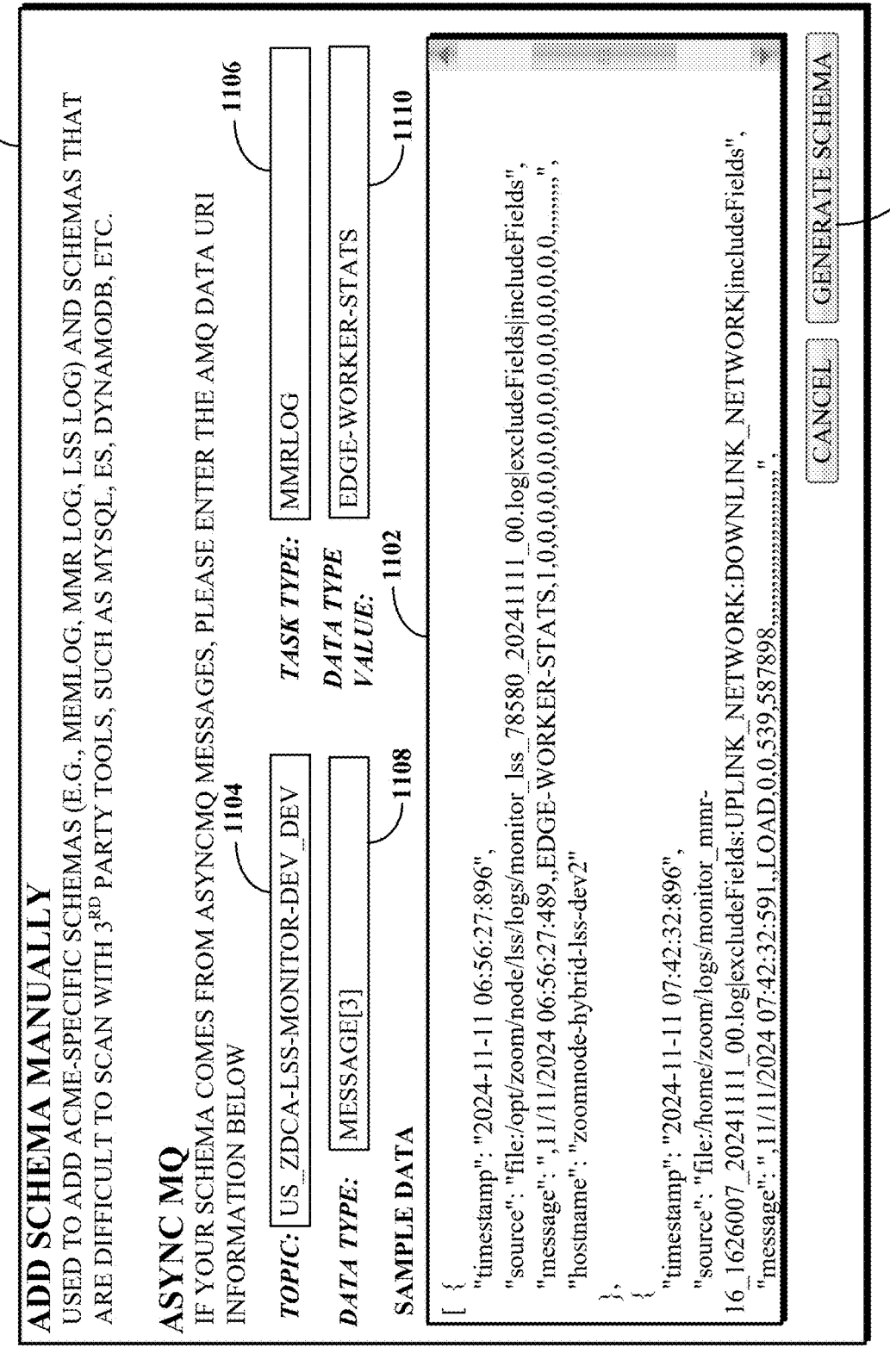

ADD SCHEMA MANUALLY
USED TO ADD ACME-SPECIFIC SCHEMAS (E.G., MEMLOG, MMR LOG, LSS LOG) AND SCHEMAS THAT ARE DIFFICULT TO SCAN WITH 3$^{RD}$ PARTY TOOLS, SUCH AS MYSQL, ES, DYNAMODB, ETC.

ASYNC MQ
IF YOUR SCHEMA COMES FROM ASYNCMQ MESSAGES, PLEASE ENTER THE AMQ DATA URI INFORMATION BELOW

*TOPIC:* US_ZDCA-LSS-MONITOR-DEV_DEV — 1104

*DATA TYPE:* MESSAGE[3] — 1108

*TASK TYPE:* MMRLOG — 1106

*DATA TYPE VALUE:* EDGE-WORKER-STATS — 1110 / 1102

1100

SAMPLE DATA

```
[ {
  "timestamp": "2024-11-11 06:56:27:896",
  "source": "file://opt/zoom/node/lss/logs/monitor_lss_78580_20241111_00.log|excludeFields|includeFields",
  "message": ",11/11/2024 06:56:27:489,,EDGE-WORKER-STATS,1,0,0,0,0,0,0,0,0,0,0,0,0,,,,,,,,,,,",
  "hostname": "zoomnode-hybrid-lss-dev2"
},
{
  "timestamp": "2024-11-11 07:42:32:896",
  "source": "file://home/zoom/logs/monitor_mmr-
16_1626007_20241111_00.log|excludeFields:UPLINK_NETWORK:DOWNLINK_NETWORK|includeFields",
  "message": ",11/11/2024 07:42:32:591,,LOAD,0,0,539,587898,,,,,,,,,,,,,,,,,,,,,,,,, ",
```

CANCEL    GENERATE SCHEMA — 1112

FIG. 11A

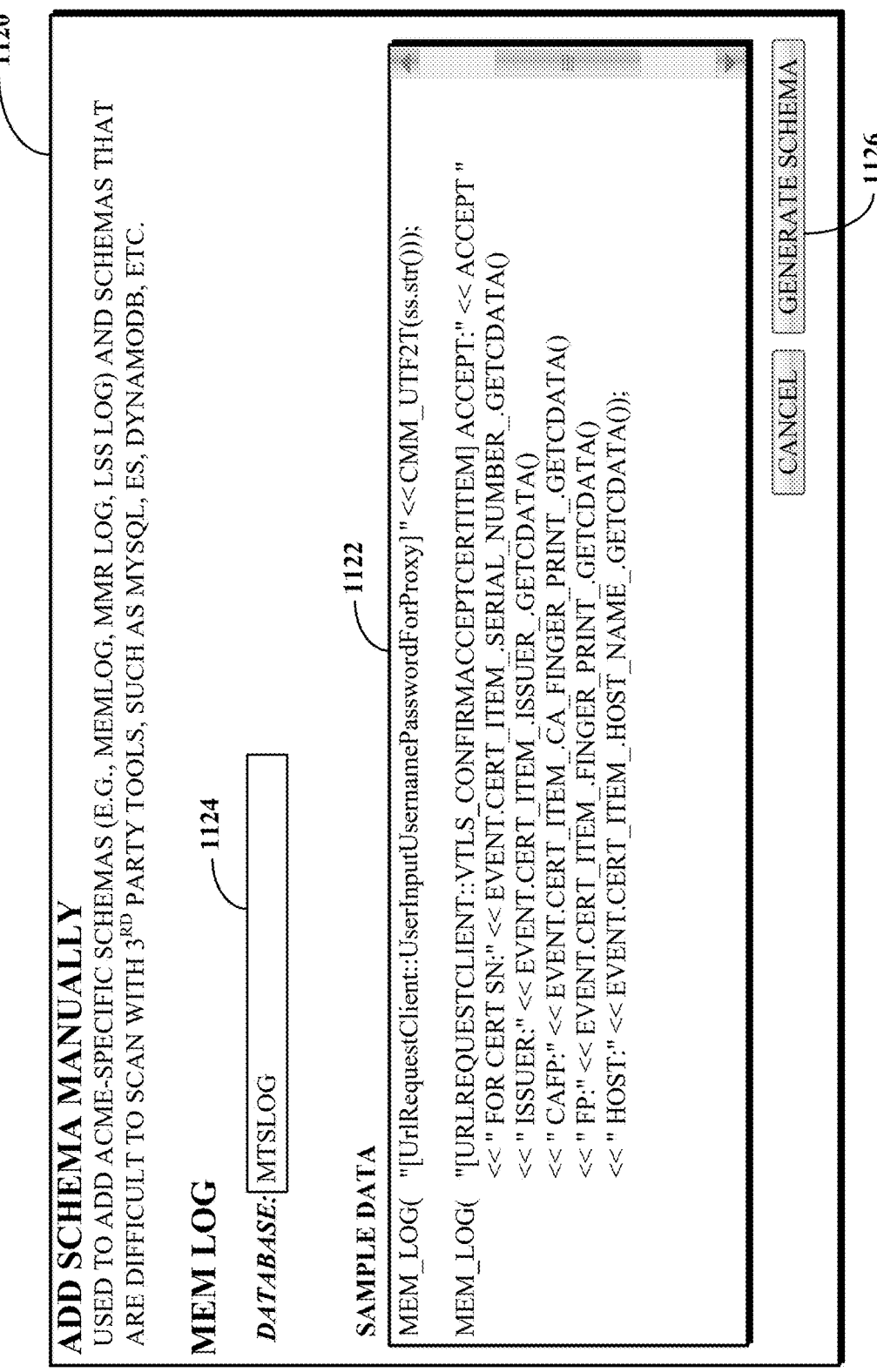

ADD SCHEMA MANUALLY

USED TO ADD ACME-SPECIFIC SCHEMAS (E.G., MEMLOG, MMR LOG, LSS LOG) AND SCHEMAS THAT
ARE DIFFICULT TO SCAN WITH 3^RD PARTY TOOLS, SUCH AS MYSQL, ES, DYNAMODB, ETC.

MEM LOG

*DATABASE:* MTSLOG

SAMPLE DATA

```
MEM_LOG( "[UrlRequestClient::UserInputUsernamePasswordForProxy]" <<CMM_UTF2T(ss.str()));

MEM_LOG( "[URLREQUESTCLIENT::VTLS_CONFIRMACCEPTCERTITEM] ACCEPT:" << ACCEPT "
      <<"FOR CERT SN:" << EVENT.CERT_ITEM_.SERIAL_NUMBER_.GETCDATA()
      <<"ISSUER:" << EVENT.CERT_ITEM_.ISSUER_.GETCDATA()
      <<"CAFP:" << EVENT.CERT_ITEM_.CA_FINGER_PRINT_.GETCDATA()
      <<"FP:" << EVENT.CERT_ITEM_.FINGER_PRINT_.GETCDATA()
      <<"HOST:" << EVENT.CERT_ITEM_.HOST_NAME_.GETCDATA());
```

CANCEL          GENERATE SCHEMA

RECEIVE OPERATIONAL DATA GENERATED BY OPERATIONS OF A
COMPUTER SYSTEM

1304

ANALYZE THE OPERATIONAL DATA TO IDENTIFY DATA
STRUCTURES WITHIN THE OPERATIONAL DATA

1306

GENERATE, BASED ON THE DATA STRUCTURES, A SCHEMA
DEFINITION IN A STANDARDIZED FORMAT

1308

INTEGRATE THE SCHEMA DEFINITION INTO THE METADATA
MANAGEMENT SYSTEM

SCHEMA GENERATION FOR OPERATIONAL DATA GOVERNANCE

FIELD

This disclosure generally relates to metadata management, and, more specifically, to automated schema generation for operational data governance.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 7A-7B illustrate an example of generating a schema from operational data derived from source code.

FIGS. 8A-8B illustrate an example of generating schemas from operational data that originates as asynchronous message queuing system (AMQ or AsyncMQ) payloads.

FIG. 8C illustrates an example of a nested JavaScript Object Notation (JSON) structure that may be contained within AMQ payloads.

FIGS. 9A-9B illustrate an example of generating schemas from operational data that contains comma-separated values (CSV) data embedded within AMQ message payloads.

FIGS. 10A-10B illustrate an example of generating schemas from operational data that contains Structured Query Language (SQL) Data Definition Language (DDL) statements, which may be included in a source code file.

FIGS. 11A-11D illustrate examples of user interfaces associated with a schema analysis tool.

DETAILED DESCRIPTION

Figure 1:
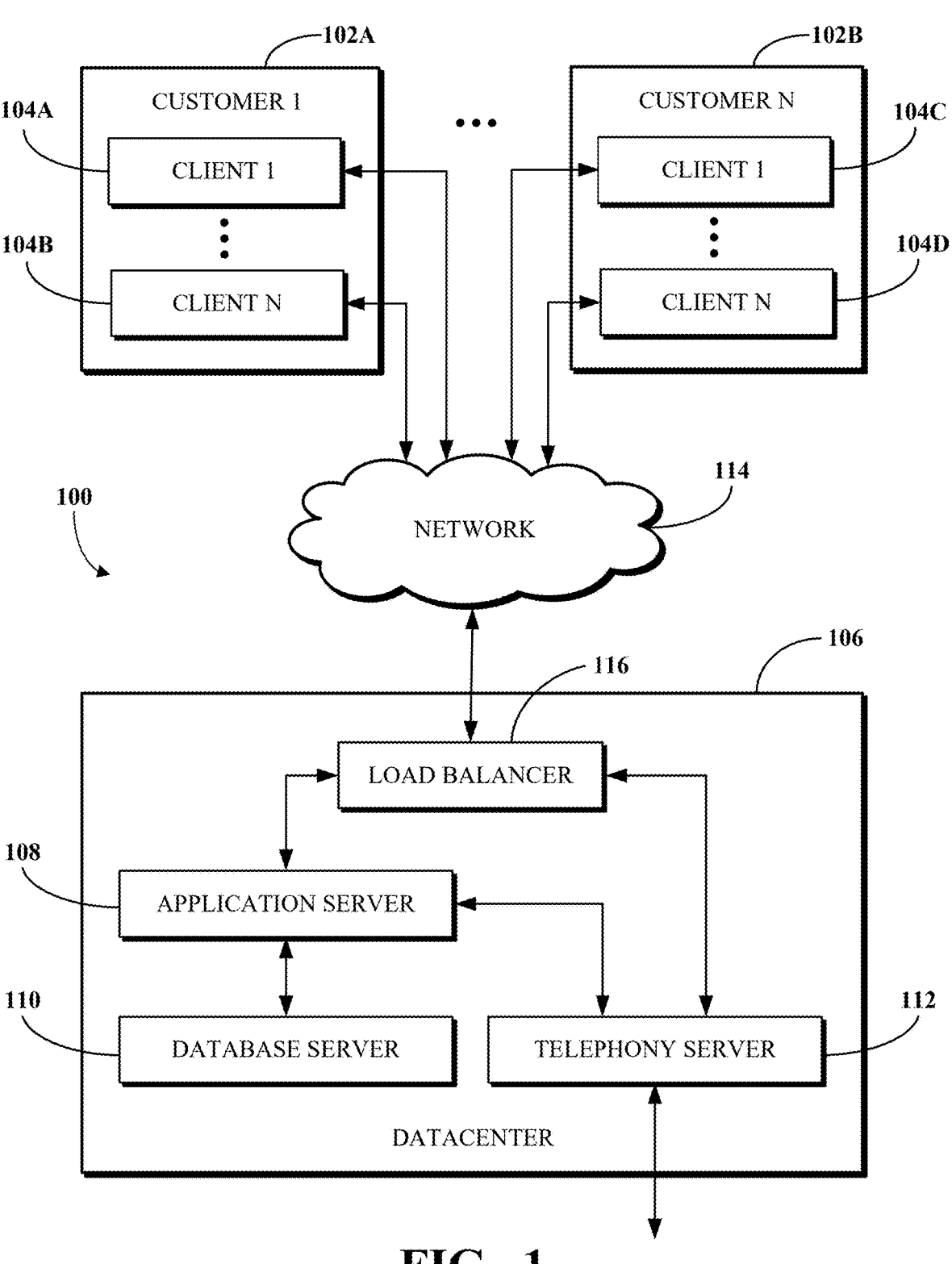
FIG. 1 is a block diagram of an example of an electronic computing and communications system.

In modern enterprises, effective data classification and metadata management are essential to ensure compliance with data governance regulations, maintain operational efficiency, and enable proper oversight of data collection and usage. An MMS serves as a cornerstone in these efforts by providing a centralized framework for organizing, tracking, and classifying data elements. Through MMS, organizations can establish standardized policies for data sensitivity, access control, and lineage tracking, enabling seamless integration with compliance workflows and analytics pipelines. Conventionally, MMS platforms obtain their data definitions from structured sources, which may typically be common database systems (e.g., relational database systems), such as via automated scanning tools that examine database schemas. These methods assume that data adheres to standardized formats and schemas, which are straightforward to parse and integrate into the MMS.

While certain third-party scanning tools can effectively analyze common database systems such as Elasticsearch, MongoDB, and DynamoDB, they cannot adequately process organization-specific operational data formats. These tools lack the capability to parse custom log formats, proprietary messaging protocols, or specialized debugging data structures that are unique to an organization's systems and applications.

However, for effective and comprehensive data classification and management, organizations must also address operational data. Operational data, as used herein, encompasses any data related to a system's operation and execution, including data generated during runtime (e.g., system logs, message queue payloads), inferred data derived from source code (e.g., log message definitions, schema structures), and metadata describing the system's configuration or telemetry. Such data may be unstructured, semi-structured, or structured, and it is often not explicitly prepared for persistent storage in conventional databases.

Operational data is typically not classified, leaving a critical gap in data governance frameworks. Operational data may be generated by software applications such as those used for synchronous or asynchronous communications. One non-limiting example of such a software application is conferencing software, which enables video-enabled conferences between participants in multiple locations. Conferencing software and other communication software can, for example, be part of a unified communications as a service (UCaaS) platform, supporting connections from both individual participants in remote locations and groups located in shared physical spaces, such as conference rooms. Other examples of such platforms and software applications include a Contact Center as a Service (CCaaS) platform, productivity software, and space management software.

Operational data includes system logs used for debugging and monitoring (e.g., client-side memory logs (MemLog) and server-side multimedia router logs (MMR logs)), inter-service messaging data (e.g., message queue payloads with nested data structures), and other data that primarily supports system operations rather than serving as a persistent data store.

Such operational data poses unique challenges because it typically lacks predefined schemas and contains implicit, variable structures that conventional MMS tools cannot readily process. Third-party scanning tools, typically designed for schema or data discovery from structured sources, cannot properly analyze organization-specific log formats or custom messaging protocols, while manual schema creation becomes unsustainable as organizations generate increasing volumes of operational data. These limitations leave organizations unable to properly classify and govern significant portions of their operational data, creating compliance risks and operational inefficiencies.

Implementations according to this disclosure solve problems such as these using an MMS (e.g., a schema analysis tool therein) that transforms unstructured or semi-structured operational data into formal, manageable schemas that can be integrated into a metadata management framework. The MMS may also be referred to as metadata management software and may be implemented by a metadata management system. The MMS can be configured to examine log message implementations in source code, parse message queue payloads, and analyze other operational data formats to automatically extract and formalize their implicit data structures into standard schema definitions that can be managed within the metadata management framework. These derived schemas can be automatically processed through governance workflows for classification and approval. Benefits of the MMS include improved data classification accuracy, enhanced compliance with privacy regulations, and reduced operational inefficiencies. By enabling a consistent and extensible approach to data governance, these implementations address critical challenges faced by enterprises managing complex and dynamic operational data.

To reiterate, implementations according to this disclosure address challenges in data governance and privacy compliance, particularly focusing on the classification and management of operational data such as debugging logs and telemetry data or other diagnostic data, which may be categorized into required operational data and optional operational data. Modern enterprises must ensure proper data classification and obtain customer consent before collecting non-essential data (e.g., optional diagnostic data), especially when gathering debugging information from client systems. Traditional metadata management approaches, while effective for structured databases, struggle with organization-specific operational data formats. The MMS described herein serves as a foundation for building comprehensive data maps, enabling organizations to track data lineage and understand how information flows through various systems. By providing a unified view of both structured and operational data, it helps organizations maintain a complete inventory of their data assets and enforce consistent governance policies across all data types.

To describe some implementations in greater detail, reference is first made to examples of hardware and software structures used to implement a system for generating schemas for operational data governance. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
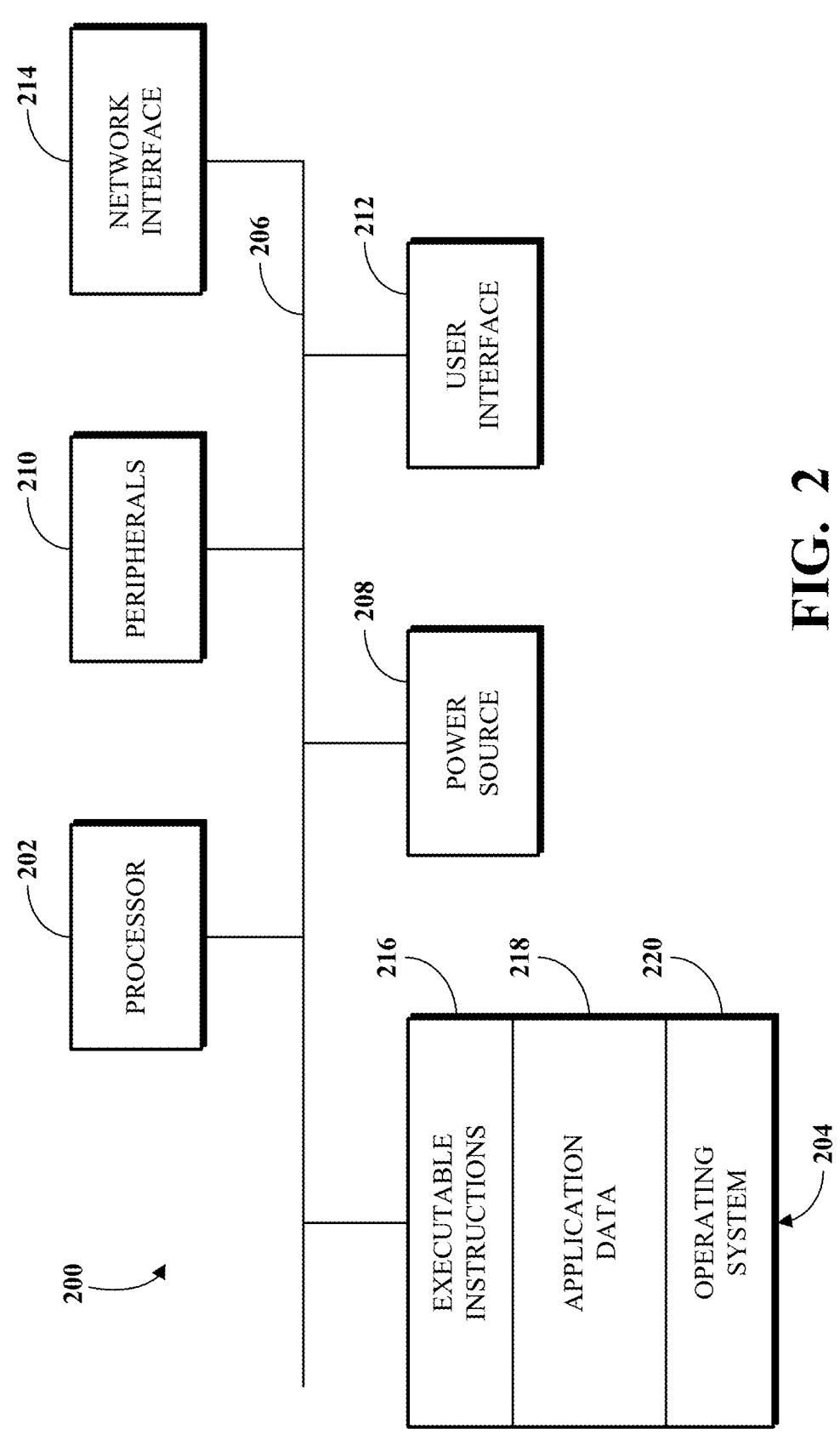
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
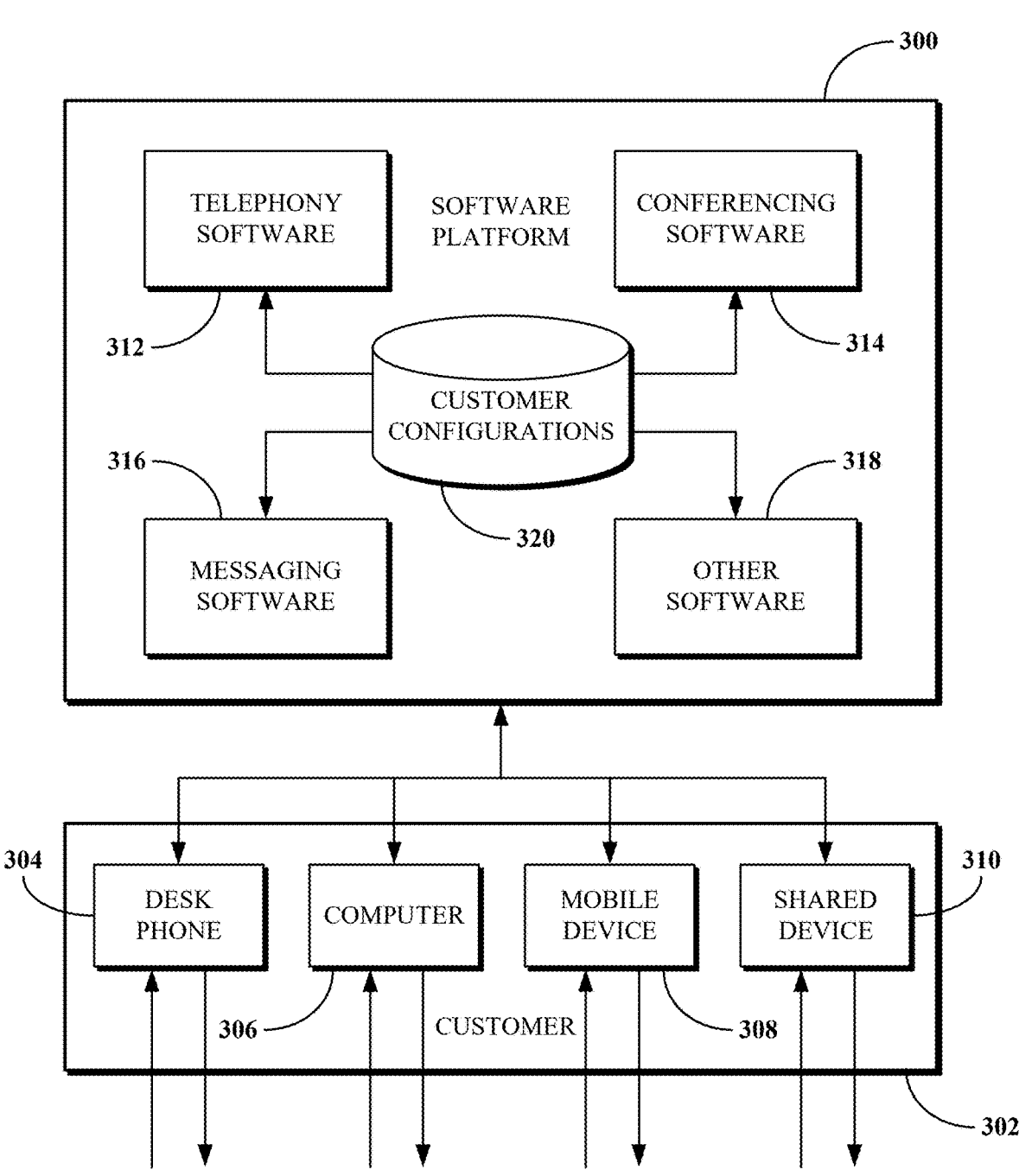
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software of an MMS that performs schema generation for operational data governance.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software

316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
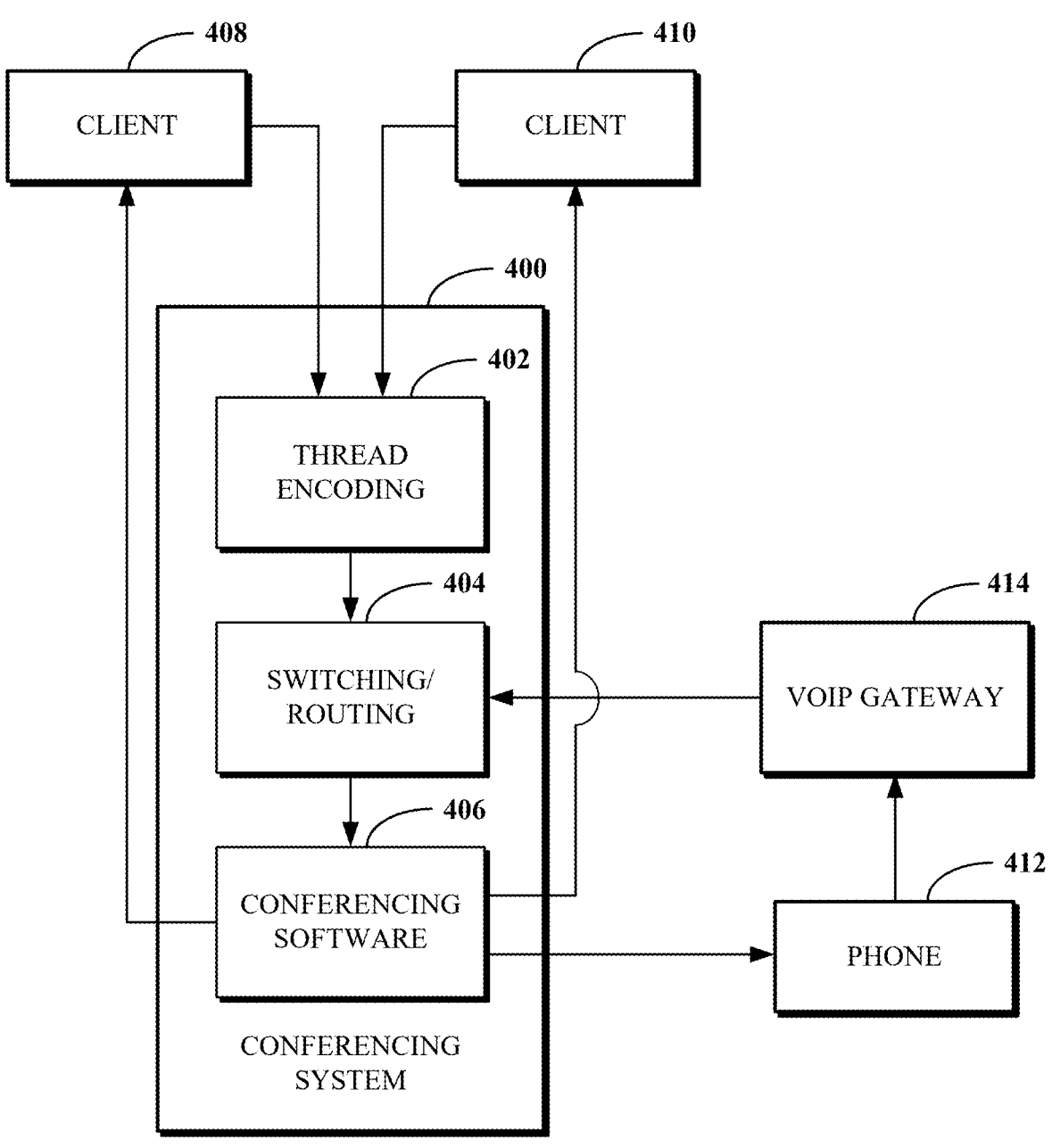
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients 304 through 310 shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 directs the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5A:
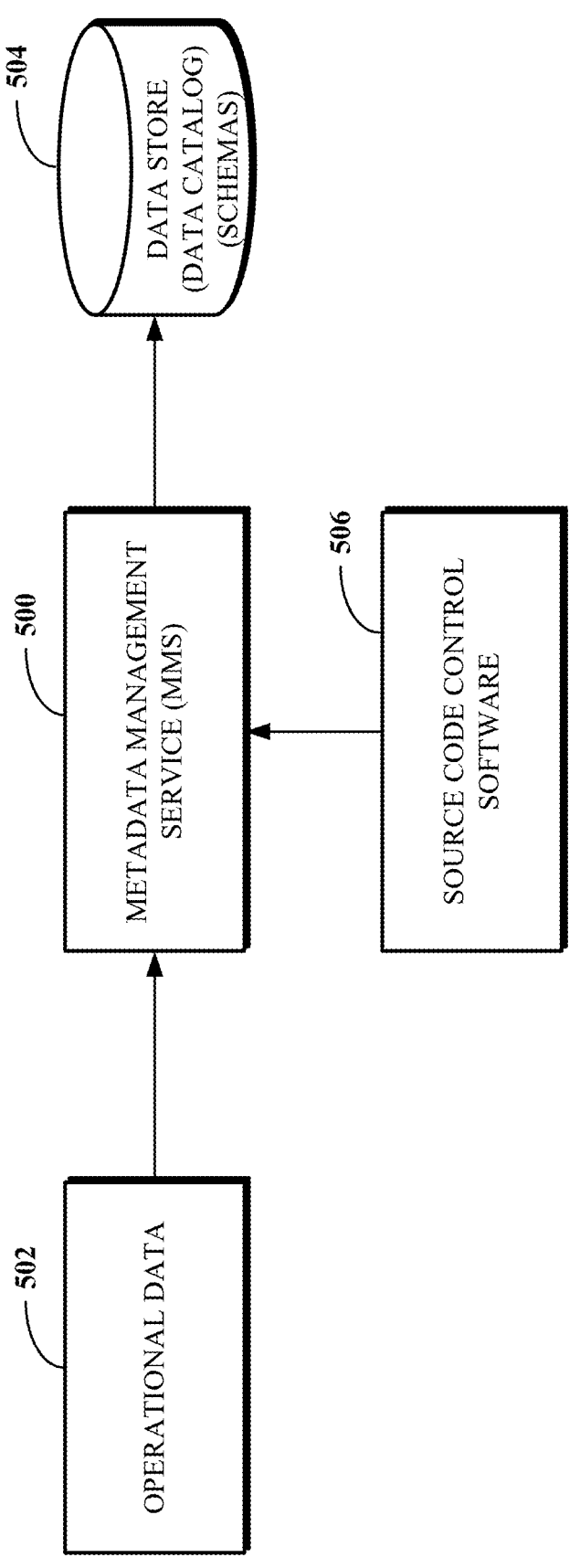
FIG. 5A is a high-level block diagram of a metadata management service (MMS) for analyzing and governing operational data.
Figures 5B, 5C:
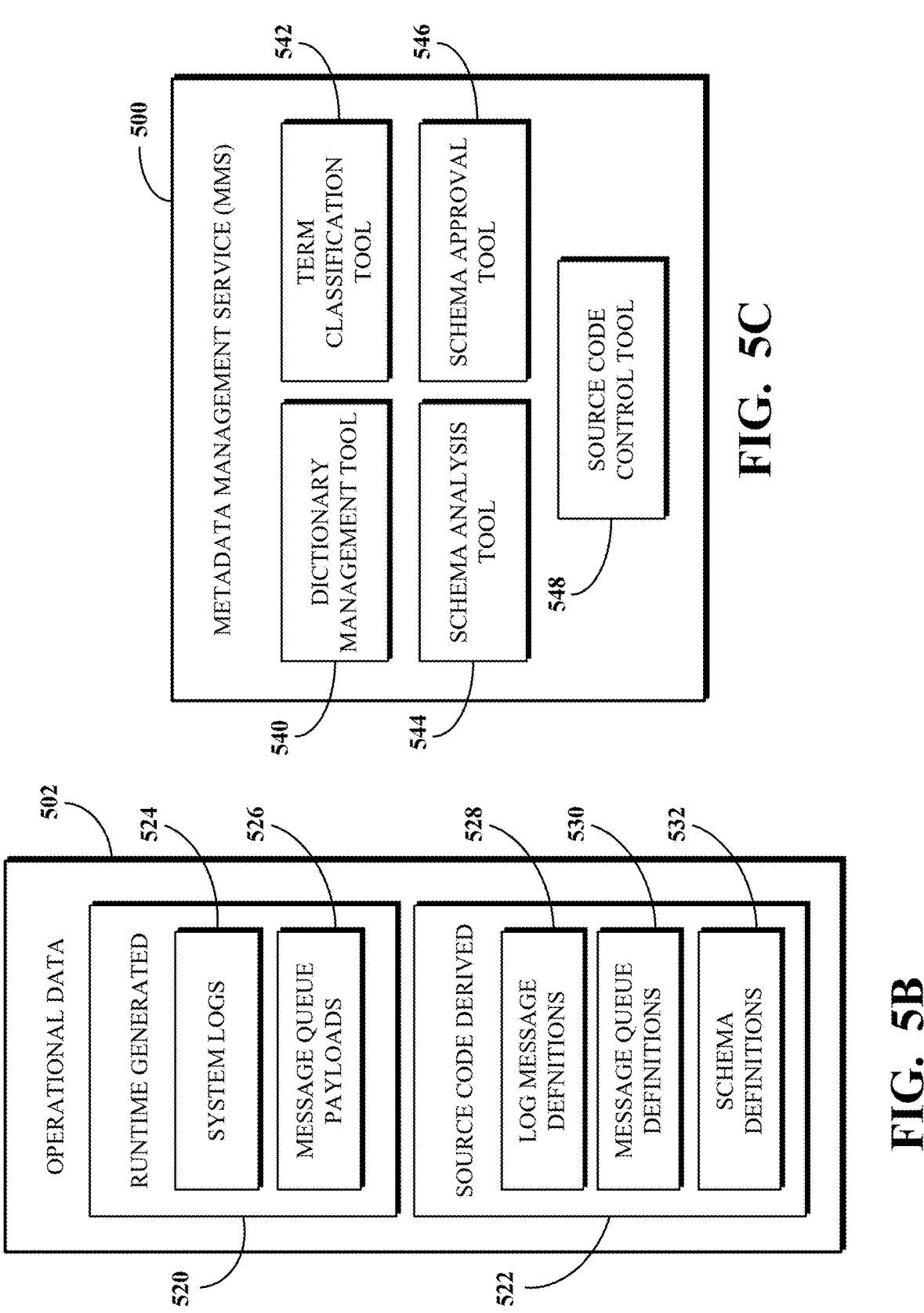
FIG. 5B illustrates examples of operational data that may be processed by the MMS.
FIG. 5C is a block diagram of example functionality of the MMS of FIG. 5A.

FIG. 5A is a high-level block diagram of an MMS 500 for analyzing and governing operational data 502, which is further described with respect to FIG. 5B.

The MMS 500 is configured to receive (e.g., ingest), analyze, and classify data structures, enforce data governance policies, and manage access control based on data sensitivity levels. The MMS 500 is further described with respect to FIG. 5C. The MMS 500 receives operational data 502, which may include runtime-generated data 520 and source code-derived structures 522, as shown in FIG. 5B. The MMS 500 performs schema generation, classification, and approval processes on the operational data 502 to extract implicit data structures and convert them into standardized schemas for governance workflows. The approved schemas, data classifications, and associated metadata are stored in the data store 504, which is configured as a centralized data catalog. This data catalog facilitates data lineage tracking, access control, and compliance reporting.

In some implementations, the MMS 500 may work in conjunction with a source code control software 506 to enforce data governance during code development and code deployment. For example, from within an integrated development environment (IDE), a developer may attempt to check code into a production repository. A production repository refers to a codebase designated for final, deployable code that will be executed in a live or customer-facing environment. As part of the check-in process, the source code control software 506 verifies with the MMS 500 whether any operational data structures within the code (e.g., log message definitions or telemetry collection mechanisms) have been approved through the governance workflow of the MMS 500. If the code contains unapproved data structures, the check-in may be blocked until the corresponding schema is reviewed and approved. Similarly, when code is promoted from test to production environments, the source code control software 506 interacts with the MMS 500 to ensure that all data structures meet approved sensitivity levels. This ensures compliance with governance workflows and organizational data policies.

FIG. 5B illustrates examples of operational data 502 that may be processed by the MMS 500. The operational data 502, as shown in FIG. 5B, serves as input to the MMS 500, as described in FIG. 5A. The MMS 500 processes this data to extract data structure definitions, generate standardized schemas, and integrate these schemas into governance workflows, thereby enabling effective data classification, access control, and compliance management. Generating schemas from operational data 502 is desirable because this data often includes variable, unstructured, or semi-structured information, such as dynamic log fields, nested message structures, or evolving database definitions, which must be formalized for effective governance, classification, and integration into metadata management workflows. Specific, non-limiting examples of the operational data 502 are described with respect to FIGS. 7A-10B.

The operational data 502 may be categorized into run-time-generated data 520 and source code-derived data 522, which collectively encompass various types of information used to support system operations and development processes. Runtime-generated data 520 includes system logs 524 and message queue payloads 526, which are dynamically generated during execution (e.g., at run-time). At least some of the runtime-generated data types may be derived from corresponding source code-derived data 522, such as log message definitions 528 and message queue definitions 530, which specify the format and structure of the logs and messages at the code level.

To illustrate, a log message definition may define variable placeholders (e.g., "accept," "serial_number") that are populated with dynamic values in the runtime system logs 524, while message queue definitions guide the structure of payloads exchanged between services. Additionally, schema definitions 532, as part of source code-derived data 522, explicitly define database structures, such as table schemas created using DDL statements.

System logs 524 encompasses a variety of log types generated during the operation of software systems, such as client-side logs and server-side logs.

Client-side logs, such as memory logs (MemLog), are generated by instructions executing on a client device, such as one of the clients 304 through 310 of FIG. 3 or clients 408 through 410 of FIG. 4. Memory logs often contain debugging information, such as details of system state and variable values at specific execution points.

Server-side logs are generated by software or platforms operating on servers, such as the software platform 300 described in FIG. 3. An example of server-side logs is multimedia router (MMR) logs, which contain performance metrics and multimedia processing data. MMR logs might track detailed statistics for audio, video, or data streams processed by the server, such as metrics that record resource usage and processing efficiency. Another example of server-side logs is Live Streaming Service (LSS) logs, which provide monitoring and diagnostic data for live streaming operations, such as connection health, latency, and streaming errors. These logs help in monitoring and maintaining the performance of live streaming services within the system.

Message queue payloads 526 may include structured or semi-structured messages exchanged between services to support distributed system operations. Such messages may include AMQ used for inter-service communication. An AMQ receives task-related details from various components, such as event triggers, system updates, or service requests, and facilitates their transmission to appropriate processing endpoints. For example, an AsyncMQ message might include timestamps, source information, and task-related metadata to ensure proper handling and tracking within the system. Such payloads may also contain nested data structures, such as JSON or CSV formats, to represent more complex inter-service communications.

Source code-derived data 522 includes log message definitions 528, message queue definitions 530, and schema definitions 532. Log message definitions 528 encompass the source code constructs that define the format and structure of log messages generated during system execution, providing a blueprint for the runtime logs described in system logs 524. Message queue definitions 530 include configurations for message queues, such as topic names and task type definitions, as well as message structure specifications, guiding the structure and format of message payloads 526 exchanged during system operation. Schema definitions 532 represent explicit declarations of database structures, such as DDL statements that define tables, fields, and relationships within a database. To illustrate, a CREATE TABLE DDL statement specifying fields (e.g., columns) like user_id, account_id, and email provides a structured representation of a database schema, which can be integrated into metadata management workflows to support governance and classification processes.

FIG. 5C is a block diagram of example functionality of the MMS 500 of FIG. 5A. The MMS 500 may be included in or work in conjunction with a collaboration platform to ensure operational data is governed and managed effectively. The MMS 500 includes tools, such as programs, subprograms, functions, routines, subroutines, operations, executable instructions, and/or the like for, inter alia, managing metadata dictionaries, classifying terms, analyzing schemas, approving schemas, classifying data sensitivity, and enforcing governance during the software development lifecycle, as further described below.

At least some of the tools of the MMS 500 can be implemented as respective software programs that may be executed by one or more computing devices. A software program can include machine-readable instructions that may be stored in a memory, and that, when executed by a processor, may cause the computing device to perform the instructions of the software program.

As shown, the MMS 500 includes a dictionary management tool 540, a term classification tool 542, a schema analysis tool 544, a schema approval tool 546, and a source code control tool 548. In some implementations, the MMS 500 can include more or fewer tools. In some implementations, some of the tools may be combined, some of the tools may be split into more tools, or a combination thereof. Each of the tools can be used separately or in conjunction with one or more other tools for their respective purposes. Some configurations of the MMS 500 may include a subset of the tools 540-548.

In some implementations, the MMS 500 may include additional tools to enhance its functionality. For example, a data lineage tracking tool may provide visibility into the origin, transformation, and movement of data across systems, supporting audits and regulatory compliance. For example, a notification and workflow management tool could automate schema review workflows, sending alerts to stakeholders when approvals are needed. For example, a historical schema comparison tool may be used to highlight changes between schema versions.

The dictionary management tool 540 is configured to manage and maintain a centralized dictionary of terms and their definitions used across schemas and metadata. The "dictionary of terms" is a centralized repository that stores standardized definitions, attributes, and relationships of terms or data elements used across one or more systems to ensure consistency, semantic clarity, and alignment with governance policies. The dictionary management tool 540 ensures consistency and semantic clarity in operational data and schema definitions by mapping variable names or data fields to pre-approved terms.

The dictionary management tool 540 may also maintain a version history of terms, facilitate bulk term imports from existing schemas, and provide term suggestion capabilities based on similar existing terms. For instance, if a developer attempts to define, via the MMS 500, a new field "cert_issuer," the dictionary management tool 540 may suggest mapping the new field to an existing "CertificateIssuer" term to maintain standardization across multiple software or systems within an organization. Standard terms may include or be associated with aliases, which are alternate names or abbreviations used to reference the same term for clarity or consistency across different contexts. For example, "cert_issuer" could serve as an alias for the standard term "CertificateIssuer."

The dictionary management tool 540 is configured to facilitate data standardization by enabling the mapping of variable names or data fields to pre-approved terms in the dictionary of terms. This functionality ensures seamless integration with governance workflows and promotes the consistent use of terminology across operational data and schema definitions.

The term classification tool 542 is configured to manage the classification framework for dictionary terms, establishing standardized sensitivity levels and governance policies that can be applied to operational data. The term classification tool 542 maintains the foundational classification rules and hierarchies that guide how terms should be used. The term classification tool 542 is configured to classify terms from the dictionary of terms or schemas based on their sensitivity levels or governance policies. The term classification tool 542 can be used to establish the baseline sensitivity level for each term in the dictionary, serving as a reference for operational data classification.

The term classification tool 542 may include or implement capabilities for automated classification suggestions based on field names, data patterns, and context. Additionally, the term classification tool 542 may support hierarchical classification schemes, where terms can inherit properties from parent classifications, and enforce naming conventions to maintain consistent terminology across sensitivity levels and security domains. The term classification tool 542 may also maintain an audit trail of classification changes, ensuring traceability and accountability in the governance process.

In an example, terms may be classified into one of six sensitivity levels, ranging from L0 to L5, based on their classification and handling requirements. Each classification level corresponds to the degree of sensitivity and required data protection. For instance, an L0 classification refers to public information that may be made openly available, such as product support articles or privacy statements. By contrast, an L5 classification represents restricted information, such as highly sensitive payment card information (PCI) or authentication data, which requires strict access control and valid business justification. Intermediate classifications, such as L3, represent confidential information, such as anonymized unique identifiers (e.g., personal meeting ID), which are protected by policies and regulations but do not require the same stringent measures as L5 data. These classifications enable governance practices, ensuring appropriate access and handling based on sensitivity.

The schema analysis tool 544 is configured to process operational data, such as logs, message queues, and source code definitions, to identify implicit or explicit data structures and generate schemas. The schema analysis tool 544 analyzes runtime-generated data as well as source code-derived structures, supporting multiple programming lan-

US 12,675,445 B1

17 guages to extract schema information. For example, the schema analysis tool 544 may parse C++ log statements, Java logging frameworks, or Python logging configurations, among others. The schema analysis tool 544 is configured to extract implicit or explicit data structures from nested data structures and can generate normalized schema representations from complex hierarchical data formats. The schema analysis tool 544 performs tasks such as parsing log messages, identifying fields and their relationships, and mapping these fields to predefined schema components to ensure compatibility with metadata management workflows and governance policies.

The schema analysis tool 544 can be configured with specialized parsing rules based on the type of operational data being analyzed. In some implementations, the schema analysis tool 544 may receive configuration parameters that define rules for analyzing different types of operational data formats.

To illustrate, for memory logs, the schema analysis tool 544 processes source code constructs that define log messages. When analyzing memory logs, the schema analysis tool 544 may be configured with rules to treat each log statement as a distinct table, extract variables from within log messages as fields, ignore fixed text strings in the log messages, generate unique table names using Base62-encoded identifiers, preserve the original source code in a field (e.g., a field extraInfo) of the schema for reference, and maintain ordering of fields based on their appearance in the log statement.

As another illustration, for AsyncMQ message payloads, the schema analysis tool 544 may be configured to handle both the message structure and any nested data formats. When processing AsyncMQ messages, the schema analysis tool 544 may be configured to construct hierarchical table names using the pattern {Topic}»{TaskType}»{Data Type}» {Data Type Value}, where » represents the ASCII character 187, flatten nested JSON structures using dot notation for field names, automatically infer field types (e.g., String, Number, Boolean, Map, Array) based on payload content, process embedded CSV data by parsing it into structured fields, and maintain the original message payload in the schema's extraInfo section.

As yet another illustration, for messages containing embedded CSV data (such as MMR logs and LSS logs), the schema analysis tool 544 may be configured to parse both the outer JSON structure and inner CSV content, and use XPath-style notation (e.g., message[1]) to reference CSV field positions. In some implementations, the schema analysis tool 544 may generate field aliases to provide meaningful names for CSV positions, preserve CSV order through explicit field indexing, and map repeated CSV patterns to structured field groups. The schema analysis tool 544 may extract field values from the embedded CSV data based on their position and map them to corresponding field definitions in the generated schema.

The schema approval tool 546 is configured to facilitate governance workflows for schema validation and approval. The schema approval tool 546 enables developers, data owners, and other stakeholders involved in operational data management to submit schemas for privacy review and approval through defined governance workflows. The schema approval tool 546 enables reviewers to analyze proposed schemas, classify their sensitivity, and determine whether they adhere to organizational standards. The schema approval tool 546 implements configurable approval workflows based on schema characteristics such as sensitivity level, data source type, or organizational division.

18

The schema approval tool 546 may maintain an audit history of schema changes, approvals, and rejections, including reviewer comments and justifications. When schema changes are proposed, the schema approval tool 546 can automatically identify impacted systems and stakeholders based on data lineage information. The schema approval tool 546 integrates with the term classification tool 542 to flag fields requiring special attention during the review process.

The source code control tool 548 is configured to enforce governance during the software development lifecycle by integrating with version control systems and continuous integration/continuous deployment (CI/CD) pipelines. The source code control tool 548 maintains a mapping between source code components and their corresponding approved schemas to facilitate rapid validation during development. When developers attempt to commit code containing new or modified operational data structures, the source code control tool 548 verifies that corresponding schemas have been approved through the governance workflow.

The source code control tool 548 can analyze committed code and configuration files to ensure compliance with data governance policies, blocking source code check-ins or promotions to production if the code generates unapproved log messages, message queue payloads, or schemas. Additionally, code attempting to collect data with sensitivity levels above permitted thresholds (such as L3 for client-side collection) is automatically blocked from deployment to production environments. This ensures that all operational data collection adheres to approved governance policies before reaching production systems.

In some implementations, the source code control tool 548 may operate differently based on the development environment. For example, the source code control tool 548 may allow code changes in development-only or internal testing environments while enforcing stricter controls for production deployments. The source code control tool 548 may integrate with telemetry privacy impact assessment (PIA) workflows, where developers must obtain specific approvals before collecting certain types of operational data. For example, the client team may be required to submit a PIA through the MMS before collecting memory log data from client systems. The source code control tool 548 may also enforce different validation rules based on the type of operational data being collected, such as applying stricter controls to client-side data collection compared to server-side logging.

Figure 6:
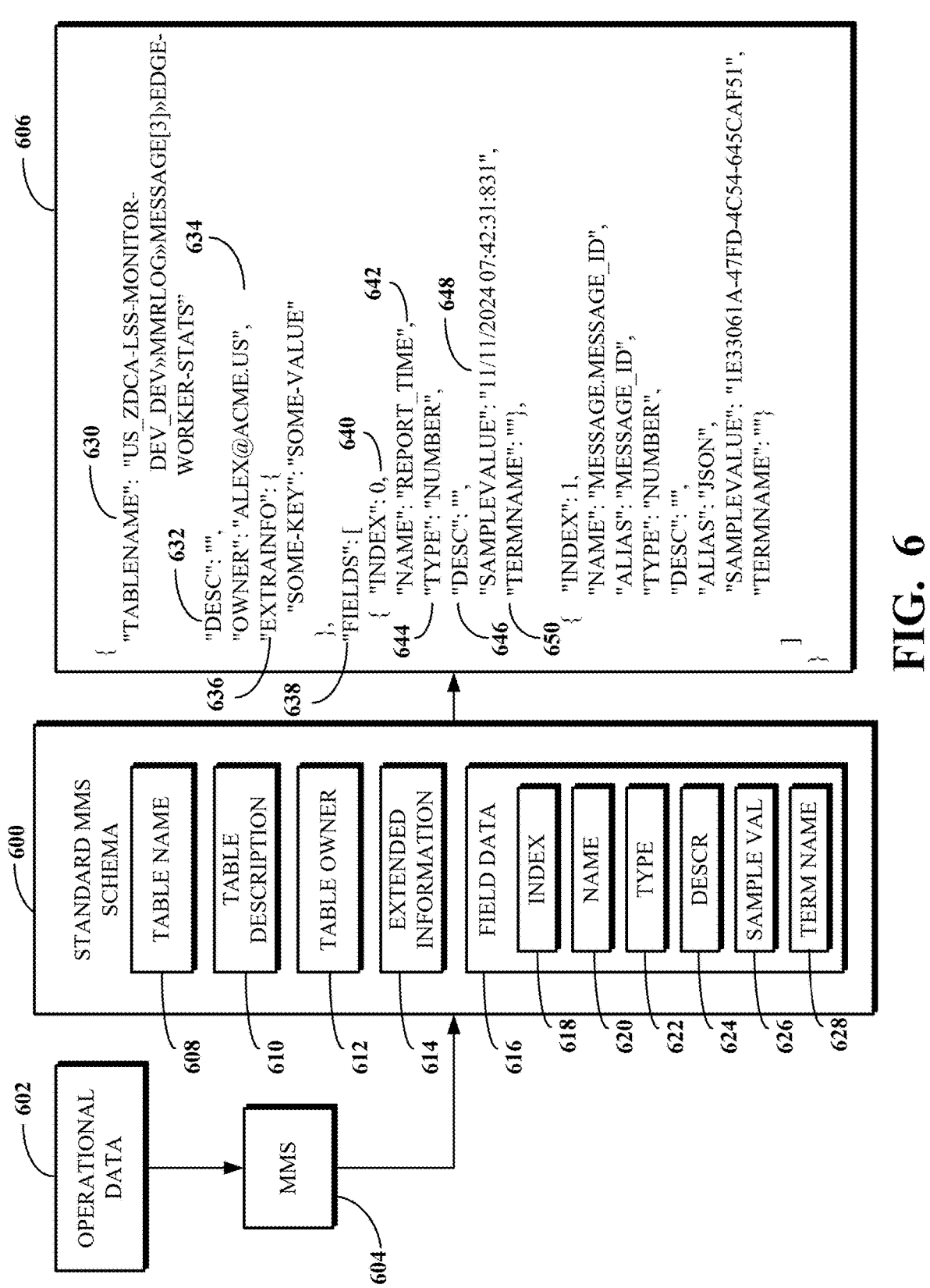
FIG. 6 illustrates an example of a standard schema definition.

FIG. 6 illustrates an example of a standard schema definition 600. In response to receiving operational data 602, an MMS 604, which may be the MMS 502 of FIG. 5A or 5C, extracts a schema in the standard schema definition 600. A schema 606 illustrates an example of a schema generated in the standard schema definition 600. The schema 606 provides a structured representation of the operational data 602, facilitating integration, governance, and analysis within the MMS 604. The standard schema definition 600 ensures consistency and clarity across different datasets by adhering to predefined schema standards.

The standard schema definition 600 includes multiple schema elements that define the structure and metadata of the extracted schema. A table name element 608 represents a unique identifier or name of the table (extracted or implied) being described. For example, as shown in a schema element 630, the table name is "US_ZDCA-LSS-MONITOR-DEV_DEV»MMRLOG»MESSAGE[3]»EDGE-WORKER-STATS," which indicates the source and context of the table. A table description element 610 provides additional contextual information about the table. As shown in the schema element 632, the table description is currently empty in this example, but it is a placeholder for explanatory text about the table's purpose or usage. A table owner element 612 identifies the individual or entity who may be responsible for the table. The table owner may be populated with an identifier of a user providing (e.g., submitting) the operational data 602 to the MMS 604. In the example schema 606, the table owner 634 is specified as "alex@acme.us," indicating the person or team accountable for maintaining this data.

An extended information element 614 includes additional metadata or contextual information about the schema. For example, a schema element 636 shows "extraInfo" with a key-value pair: "some-key": "some-value", which may represent supplementary configuration or metadata tied to the table. A field data section 616 defines the structure of individual table fields (i.e., attributes) within the table, as illustrated in section 638 of the schema 606.

An index element 618 specifies the order or position of a field within the schema. For instance, as shown in a field 640, the first field has an index value of 0 (i.e., first position). The name element 620 identifies the name of the field. In the schema 606, the first field has the name 642 (e.g., "REPORT_TIME"), while the second field is named "MESSAGE.MESSAGE_ID". The type element 622 specifies the data type of the field. For example, a field 644 shows the first field has a type of "NUMBER". A description element 624 provides additional details about the field. While empty in the description 646, it may be intended to store descriptive information about the field's content or purpose.

A sample value element 626 provides an example value for the field, aiding in understanding its typical content. For example, the first field's sample value 648 is "11/11/2024 07:42:31:831", representing a timestamp, while the second field's sample value is "1E33061A-47FD-4C54-645CAF51", suggesting it is a unique identifier. A term name element 628 maps the field to a standardized term in the data dictionary, ensuring consistency across schemas. In this example, the term name is currently empty for the field 650 but serves as a placeholder for alignment with pre-approved terms.

FIGS. 7A-7B illustrate an example 700 of generating a schema from operational data derived from source code. The example 700 includes source code 702 (written in C++ in this example), which contains two statements that log data at runtime: a first statement 704 and a second statement 706. The first statement 704 writes a single log message to a memory log, while the second statement 706 produces a more complex log entry, with multiple variables and associated data. These log statements are treated as inputs to an MMS, and more specifically, to a schema analysis tool therein, such as the schema analysis tool 544 of FIG. 5C.

The schema analysis tool processes the log statements, parses the data, and generates schemas in a standardized format, such as the standardized format illustrated in FIG. 6. A first schema 708 corresponds to the first log statement 704, while a second schema 710 corresponds to the second log statement 706. Each log statement is parsed according to predefined rules to extract table and field definitions. Each log line is treated as a table, and each variable within the log is treated as a field. Fixed text strings within the logs are ignored, so that only dynamic data elements (e.g., variables) are extracted and represented in the schema.

The schemas are automatically assigned unique table names using a table identifier generator. The table identifier generator creates globally unique identifiers by combining an n-bit (e.g., 64-bit) time-ordered numeric identifier with Base62 encoding. This process encodes the numeric identifier into a shorter alphanumeric string using a character set of 0-9, A-Z, and a-z, resulting in compact, human-readable, and sortable table names. To illustrate, the first schema 708 is assigned a table name 712 of "2CZ5NR9GTXZ."

Table descriptions, such as table description 714, can be populated (e.g., provided) by a submitter of (e.g., the person submitting) the operational data 702 to the MMS. Table owners, such as a table owner 716, are set to the identifier of the submitter. Additional metadata, such as extended information 718, retains the original log message content for reference but may be editable (modifiable) for further customization. Sample values for fields, such as a sample value 720, may be derived (if possible) from the runtime data, ensuring relevance to actual system operations.

As described with respect to FIG. 6, in the generated schemas, the fields within each table are sequentially indexed to preserve their order as they appear in the log. For instance, the fields 722 in the first schema 708 are indexed starting from 0, with the first field named "CMM_UTF2T (SS.STR( ))." In the second schema 710, multiple fields (i.e., fields 724) are indexed, such as the field with the name "ACCEPT," which appears at index 0, and the field 726 with the name "EVENT.CERT_ITEM_HOST_NAME_GETC-DATA( )" at index 5, corresponding to a parameter 728 of the second log statement 706. Field names can incorporate both processing functions and variable identifiers extracted from the source code so that the schema can accurately represent the structure and semantics of the log-generating code.

As further described with respect to FIGS. 11A-11D, the schema analysis tool enables viewing and editing parsed fields and source code through a user interface. For example, software engineers can directly paste log-generating code (such as the operational data 702) into the user interface for processing, with the ability to handle multiple log statements together. Generated schemas can be refreshed and updated to reflect ongoing modifications to the request. Via the user interface, users may provide or edit data such as the table description, field descriptions, sample values, and other data fields that are not automatically set by the system. Certain fields or metadata, once automatically set, may remain uneditable through the user interface to preserve data integrity or governance policies.

FIGS. 8A-8B illustrate an example 800 of generating schemas from operational data 802 that originates as AMQ payloads. The operational data 802 is presented in plain text JSON format, but other formats, such as Base64-encoded or binary messages, are possible. An MMS, and more specifically, a schema analysis tool therein, such as the schema analysis tool 544 of FIG. 5C, processes the operational data 802 and generates a schema 804 (as shown in FIG. 8B) in the standardized format 600, as shown in FIG. 6.

The operational data 802 (e.g., an AMQ payload) may include a variety of metadata and payload content. In this example, it contains a JSON object describing a message with attributes such as a name element 808, which identifies a topic (e.g., "internal_topic_dispatch_v4_aws_dynamodb_global»dispatchentity»type»business"), and other metadata elements, such as "physical Table-Names" (shown as an empty array), "databaseType" set to "DEFAULT", "databaseNamespace" set to "asyncmq", "createdTime", "modifyTime", "createdBy", and "modi-fyBy". These elements provide details about the AMQ message, including its creation and modification times, origin, and modification user.

In the generated schema 804, a table name 810 is derived based on the Data Uniform Resource Identifier (URI), which may include components such as Topic, Task Type, Data Type, and Data Type Value. The Topic identifies a specific messaging channel or queue in the message broker system; the Task Type refers to a subcategory or type of task associated with the messages under a particular Topic and may represent a functional operation or a specific task being processed; the Data Type may refer to a specific field or key in the JSON payload of the message that is used to further categorize or identify the message; and the Data Type Value represents the value extracted from the JSON field defined by the Data Type. These components are combined using a separator (», ASCII 187), resulting in a table name such as "US_ZDCA-LSS-MONITOR-DEV_DEV»MMR-LOG»MESSAGE[3]»EDGE-WORKER-STATS".

The fields in the schema 804 are extracted from the JSON payload, where each field corresponds to a key-value pair or nested structure within the input data. For example, the schema 804 includes fields such as: an indexed field with name "TIMESTAMP" of type "DATE" with a sample value "11/11/2024 07:42:31:831"; a field 812 with the name "REPORT_TIME", which is identified as a NUMBER type with a sample value "11/11/2024 07:42:31:831"; and a field "MESSAGE.MESSAGE_ID" with an alias "MES-SAGE_ID", also identified as a NUMBER type, with a sample value "1E33061A-47FD-4C54-8A55-645CAF51BDD".

FIG. 8C illustrates an example of a nested JSON structure 814 that may be contained within AMQ payloads. In some examples, the AMQ payload (e.g., the operational data 802) may contain nested JSON structures, where certain JSON field values within the payload themselves contain stringified JSON data. The nested JSON structure 814 shows a message payload containing nested fields such as "LOG-TYPE", "LOGDATE", and other monitoring data. When processing such nested structures, the schema analysis tool flattens the hierarchical data into proper JSON structured data and automatically determines field types (e.g., String, Number, Boolean, Map, Array) for both top-level fields (timestamp, source) and nested fields from the message content while maintaining relationships between related data elements.

Figure 9A:
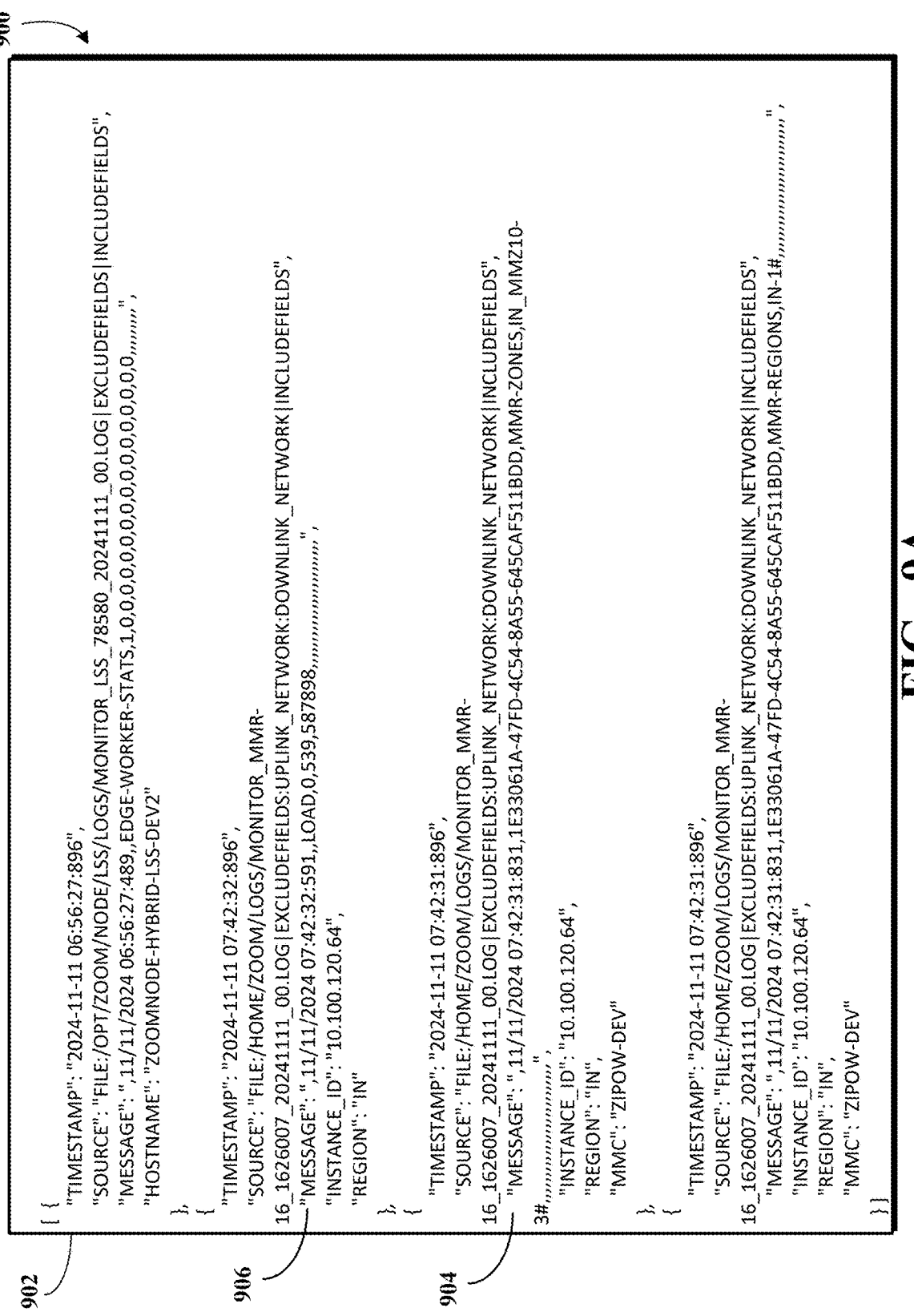

FIGS. 9A-9B illustrate an example 900 of generating schemas from operational data that contains CSV data embedded within AMQ message payloads. FIG. 9A shows operational data 902 presented as a JSON array containing multiple message examples, each representing different types of operational data such as LSS Log and Simple MMR Log data. In the operational data 902 shown, each message contains a timestamp, source file path, and a "message" field that encapsulates CSV-formatted data, along with associated metadata such as hostname, instance_id, region, and mmc values. However, different content are also possible.

As illustrated in FIG. 9B, the schema generation process uses a hierarchical naming convention comprising Topic, Task Type, Data Type, and Data Type Value components, which are referred to collectively herein as data URI. Users provide the data URI components through dedicated input fields in a user interface. The Topic component identifies a specific messaging channel or queue in the message broker system (e.g., 'US_ZDCA-LSS-MONITOR-DEV_DEV'). The Task Type component indicates a processing category or operation type under the specified Topic (e.g., 'MMRLOG'). The Data Type component specifies both a field name and index (e.g., 'MESSAGE[3]'). The Data Type Value component represents a value that further identifies the schema type, and it may be manually specified by the user or automatically extracted from the message content by the schema analysis tool (e.g., 'EDGE-WORKER-STATS').

These components may be provided in varying levels of completeness. A user may specify only the Topic, or may provide additional components for greater schema precision. The schema analysis tool combines any provided components using a separator character (», ASCII 187) to create a unique schema identifier. For example, when all components are specified, the resulting schema identifier might be 'US_ZDCA-LSS-MONITOR-DEV DEV»MMR-LOG»MESSAGE[3]»EDGE-WORKER-STATS'. This schema identifier serves as the table name in the generated schema and provides a standardized way to identify and categorize different types of operational data within the MMS.

FIG. 9B illustrates a generated schema 920 that corresponds to one of the message examples from the operational data 902. The schema 920 follows a standardized format where the table name is constructed hierarchically using a separator (»>) to combine the URI components. For example, the table name "US_ZDCA-LSS-MONITOR-DEV_DEV»MMRLOG»MESSAGE[3]»EDGE-WORKER-STATS" represents a fully qualified schema identifier. The schema defines fields using an XPath-like notation to address both JSON and CSV elements. For example, message[1], derived from a message 904 indicates the second position (where the first position would be indexed as message[0]) in the CSV array, which is mapped to an alias "REPORT_TIME" with a number type.

Each field definition includes multiple attributes: an index maintaining the original CSV ordering, a name that uses array index notation to identify field positions within CSV data (e.g., 'message[1]' indicates the value at the second position in the message field, since indexing starts at 0), an optional alias for readability, an inferred data type (string, date, or number), and a sample value extracted from the operational data.

FIGS. 10A-10B illustrate an example 1000 of generating schemas from operational data that contains SQL DDL statements, which may be included in a source code file. FIG. 10A shows operational data 1002 in the form of a CREATE TABLE statement defining a table "DAS_USER". The DDL statement specifies column names, data types, constraints, and index definitions in standard SQL syntax. The table name 1006 "DAS_USER" in the DDL statement is used to generate a corresponding table name 1008 in the schema representation shown in FIG. 10B.

FIG. 10B illustrates a generated schema 1004 that follows a standardized schema format for representing the table structure. For each column defined in the operational data 1002, the schema includes a corresponding field definition. For example, corresponding to the column definition 1010 for "USER_ID", the schema generates a field 1012 that captures all relevant attributes. The schema maintains the ordering of columns through sequential index values, with each field definition capturing the complete set of attributes from the DDL statement. For example, the schema preserves VARCHAR length specifications in a "LENGTH" field, maintains collation settings in a "COLLATION" field, and represents column constraints like "NOT NULL" and "PRI-MARY KEY" in a "CONSTRAINTS" array.

The schema captures the table's key definitions and indexing structure within the "EXTRAINFO" section. This section includes the original DDL statement for reference and a structured representation of all index definitions—including the primary key on "USER_ID", the "ACCOUNT_INDEX" on "ACCOUNT_ID", and other table-level constraints. The schema format also provides fields for governance metadata such as description ("DESC"), owner, and term names, which begin as empty and may be populated during the schema review and approval process. The original DDL statement is retained in the "extraInfo" section for reference, along with a structured representation of the index definitions. This standardized schema format enables consistent processing and governance of database structural definitions within the MMS.

Figure 11C:
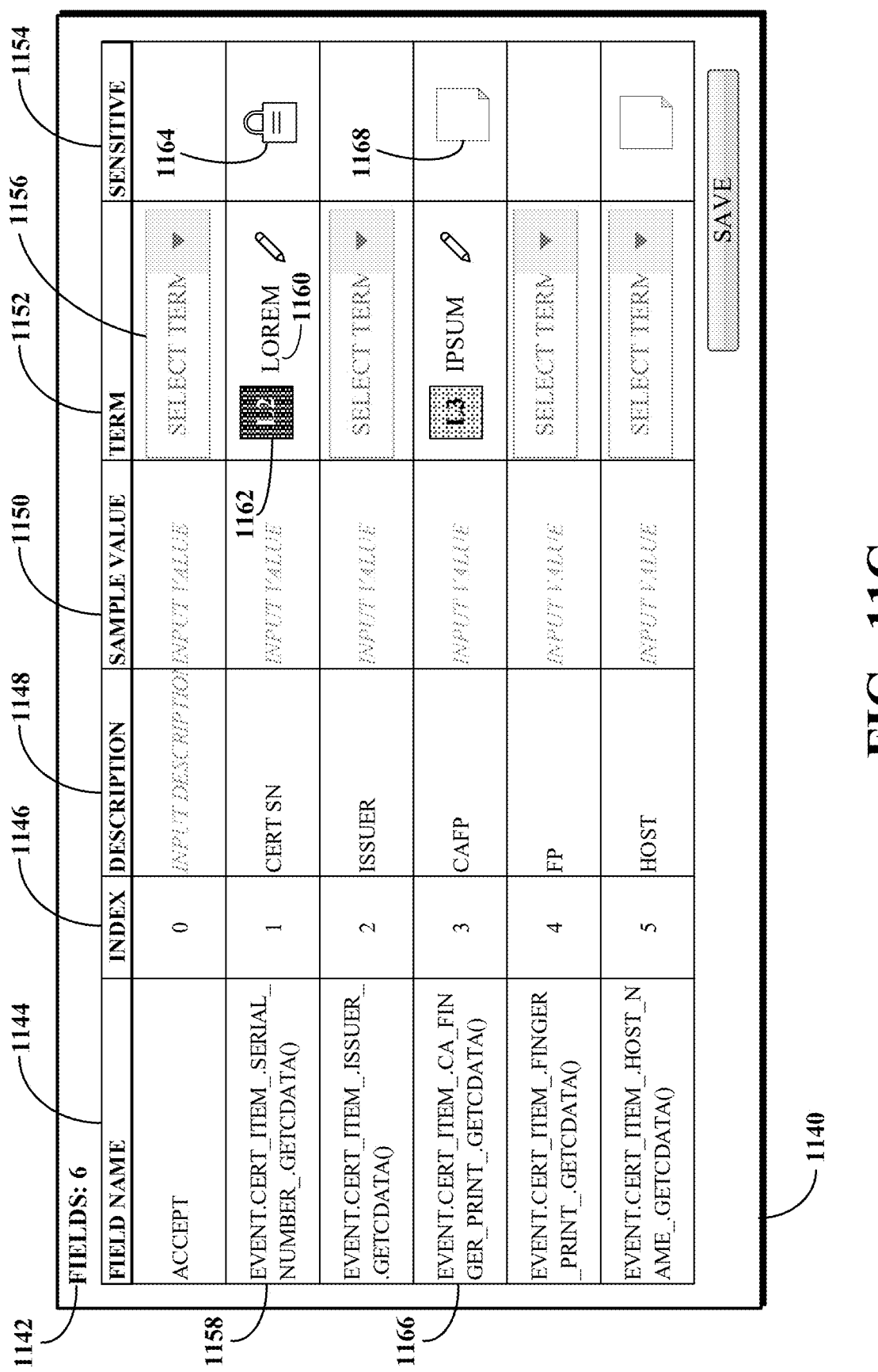

FIGS. 11A-11D illustrate examples of user interfaces associated with (e.g., generated or rendered by) a schema analysis tool, such as the schema analysis tool 544 of FIG. 5C. FIG. 11A illustrates a user interface 1100 through which a user can input operational data to generate a schema. The user interface 1100 illustrates generating a schema from operational data entered in a text box 1102. The operational data is that described with respect to FIG. 9A. That is, the operational data is AMQ operational data. A user interacting with the user interface 1100 can provide AMQ data URI information through a series of input fields: a Topic field 1104 (shown populated with "US_ZDCA-LSS-MONITOR-DEV_DEV"), a Task Type field 1106 (shown populated with "MMRLOG"), a Data Type field 1108 (shown populated with "MESSAGE[3]"), and a Data Type Value field 1110 (shown populated with "EDGE-WORKER-STATS").

The text box 1102 allows users to input sample JSON-formatted AMQ messages. In the illustrated example, the text box 1102 contains multiple message entries, each with timestamps, source file paths, and message content related to system monitoring logs. The interface 1100 includes action a control 1112 that, when invoked, triggers the schema generation process based on the provided AMQ Data URI parameters and the operational data.

FIG. 11B illustrates a user interface 1120 through which a user can input operational data to generate a schema. The user interface 1120 illustrates generating a schema from operational data entered in a text box 1122. The operational data is that described with respect to FIG. 7A. That is, the operational data consists of log statements obtained from source code that generate log messages at runtime. In the text box 1124, the user can provide the name of a database to which the schema is to be added. In this context, a database is a collection (e.g., a convenient grouping) of schemas generated by the schema analysis tool.

The interface includes a control 1126 that, when invoked, triggers the schema generation process. When the control 1126 is invoked, the schema analysis tool parses the log statements in text box 1122, extracting variable names and data structures to generate a standardized schema definition. Each log statement is treated as a table, and each variable within the log statement is treated as a field in that table, while fixed text strings are ignored during the schema generation process.

FIG. 11C illustrates a user interface 1140 that displays a schema generated from parsing operational data. Specifically, the user interface 1140 displays the schema generated by parsing the MEM_LOG statement shown in FIG. 11B. A header 1142 indicates the number of fields ("FIELDS: 6") identified in the parsed operational data.

The user interface 1140 includes a table organized into columns 1144 through 1154 for field name, index, description, sample value, term, and sensitivity. respectively. The field name column (e.g., the column 1144) shows the variable names extracted from the operational data (e.g., "accept" and "event.cert_item_.serial_number_GetCData( )" extracted from the MEM_LOG statement). The index column (e.g., the column 1146) preserves the order (0-5) in which the variables appear in the operational data. The column 1148 (e.g., the description column) may be automatically extracted from the operational data or provided/modified by a user of the user interface 1140. Similarly, the column 1150 (e.g., the sample value column) may be automatically populated from the operational data or provided/modified by the user. Additionally, the column 1150 may be populated for a variable based on a selected mapping to a term in a dictionary of terms. The column 1152 (e.g., the term column) enables mapping fields to standardized terms from the dictionary, while the column 1154 (e.g., the sensitivity column) indicates whether a field contains sensitive information.

Using a control 1156, the user can map an identified field to a term in the dictionary of terms. While the schema analysis tool may automatically suggest mappings based on matches between field names (or aliases associated therewith) and dictionary terms, the user can override these suggestions. The user interface 1140 illustrates that a field 1158 is mapped to a term 1160 (e.g., "LOREM"), which has a classification 1162 (e.g., L2 indicated by a pattern), and is marked as sensitive via an icon 1164 (a lock). Similarly, a field 1166 is mapped to a term "IPSUM," which has a classification of L3, and is marked as non-sensitive via an icon 1168.

Modifications made through the user interface 1140 are reflected in the standard schema definition (e.g., the standard schema definition described with respect to FIG. 6), ensuring that the enhanced schema maintains a consistent format for integration into the MMS. For example, in this case, the modifications may be saved to the second schema 710 of FIG. 7B.

Figure 11D:
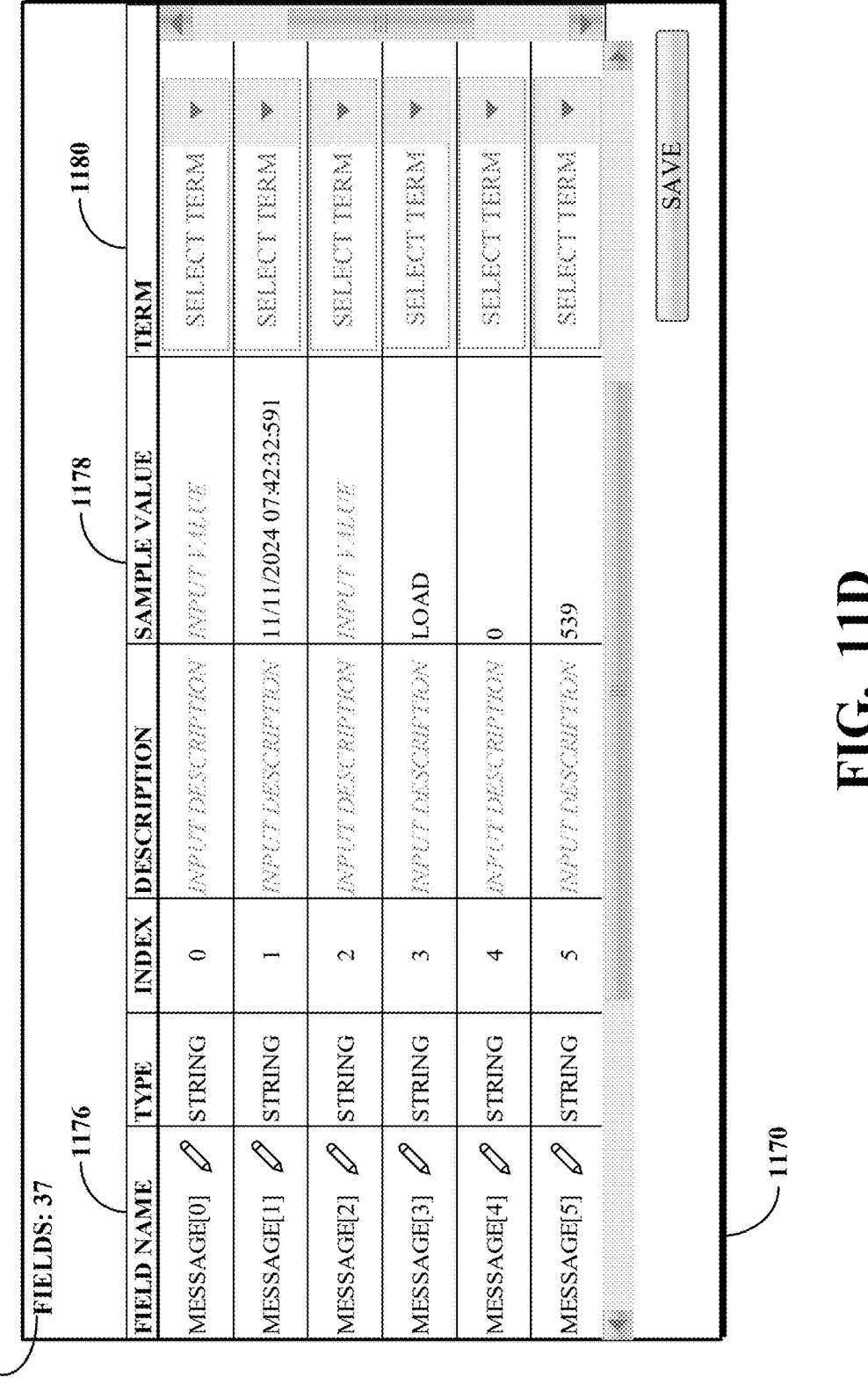

FIG. 11D illustrates a user interface 1170 that displays field details for an AMQ message schema. The user interface 1170 shows the parsed fields from a message 1172, which is the same as message 906 of FIG. 9A. A header 1174 indicates that the message 1172 includes 37 fields (corresponding to the number of comma-separated values in the message 1172). The user interface 1170 displays a table having columns including a field name column 1176, a sample value column 1178, and a term selection column 1180. Each row represents a field parsed from the message, with field names defaulting to MESSAGE[0] through MESSAGE[36] based on their position in the comma-separated message format. The sample value column 1178 shows the actual values extracted from the message 1172, if any. The term selection column 1180 includes dropdown controls labeled "SELECT TERM" for mapping each field to standardized terms from a dictionary of terms.

Figure 12:
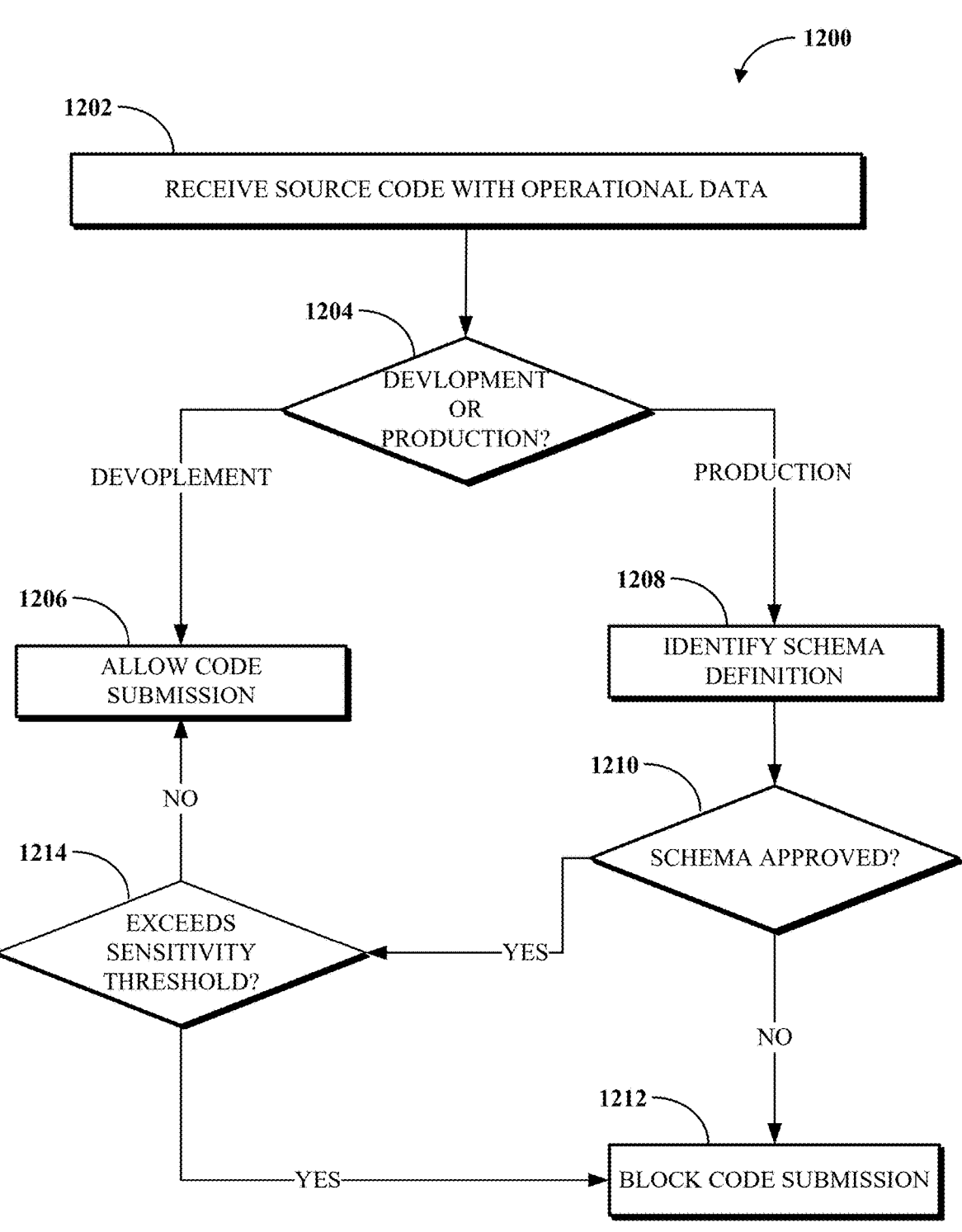
FIG. 12 is a flowchart of an example of a technique for controlling source code submission based on operational data governance requirements.

To further describe some implementations in greater detail, reference is next made to examples of techniques which may be performed by or using a system for schema generation for operational data governance. FIG. 12 is a flowchart of an example of a technique 1200 for controlling source code submission based on operational data governance requirements. The technique 1200 can be executed using computing devices, such as the systems, hardware, and software described with respect to FIGS. 1-11D. The technique 1200 can be performed, for example, by executing a machine-readable program or other computer-executable instructions, such as routines, instructions, programs, or other code. The steps, or operations, of the technique 1200, or another technique, method, process, or algorithm described in connection with the implementations disclosed

25 herein can be implemented directly in hardware, firmware, software executed by hardware, circuitry, or a combination thereof.

At 1202, source code containing operational data collection instructions is received. The operational data collection instructions may include log message definitions, message queue configurations, or other instructions that specify data to be collected during runtime execution. At 1204, a determination is made whether the source code is being submitted (e.g., checked in) to a development environment (e.g., a development source code repository) or a production environment. This determination affects the subsequent validation and approval requirements for the source code submission. If the determination at 1204 indicates a development environment, the technique 1200 proceeds to 1206, where the code submission is allowed without additional validation requirements. This enables developers to freely iterate on code changes in non-production environments.

If the determination at 1204 indicates a production environment, the technique 1200 proceeds to step 1208, where a schema definition is identified from the operational data collection instructions in the source code. At 1210, a determination is made whether the identified schema definition has been approved, such as through a governance workflow. This approval process ensures proper review of data collection practices before deployment to production systems. If the determination at 1210 indicates the schema is not approved, the technique 1200 proceeds 1212, where the code submission is blocked. This prevents unapproved data collection mechanisms from being deployed to production environments.

If the determination at 1210 indicates the schema is approved, the process proceeds to 1214, where a determination is made whether any data elements defined in the schema exceed a sensitivity threshold. This check ensures compliance with data privacy and governance requirements. If the determination at 1214 indicates the sensitivity threshold is exceeded, the technique 1200 proceeds to 1212, where the code submission is blocked. This prevents collection of overly sensitive data in production environments. If the determination at 1214 indicates the sensitivity threshold is not exceeded, the technique 1200 proceeds to 1206, where the code submission is allowed, having passed both the schema approval and sensitivity threshold requirements for production deployment.

Figure 13:
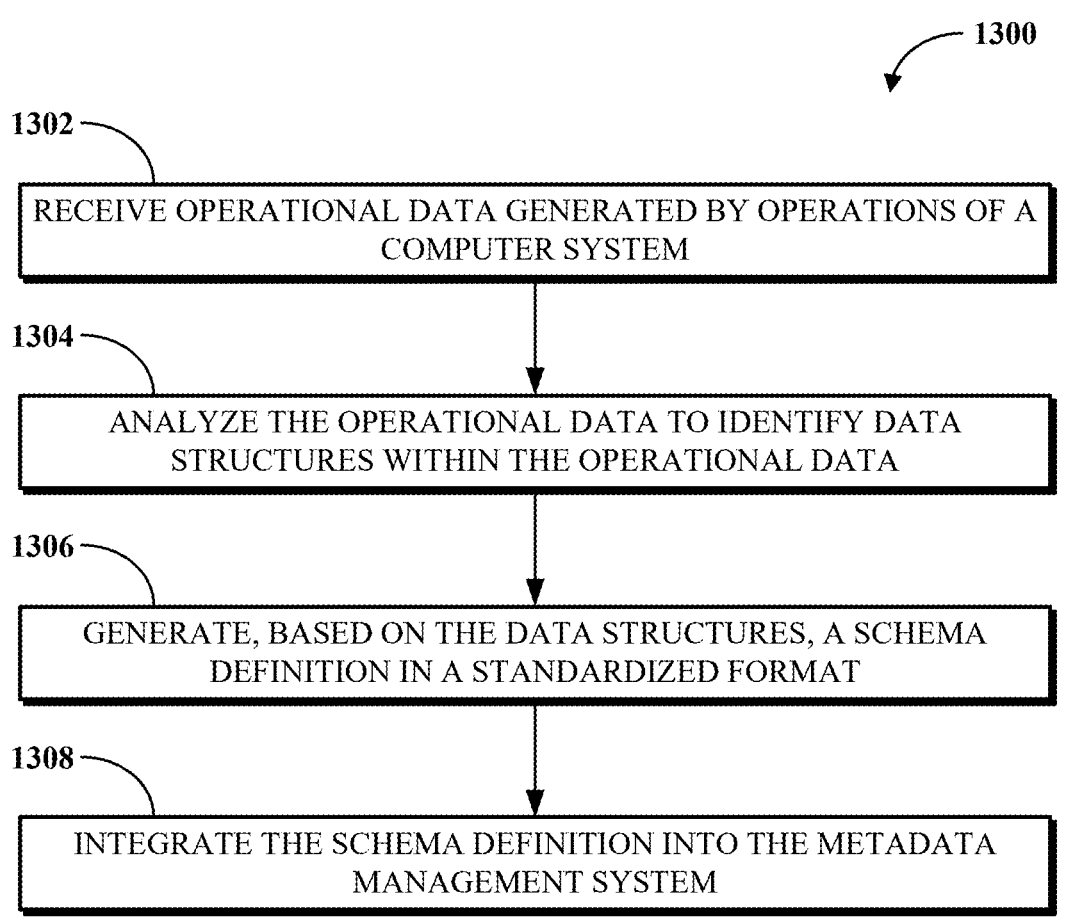
FIG. 13 is a flowchart of an example of a technique for generating a schema from operational data.

FIG. 13 is a flowchart of an example of a technique 1300 for generating a schema from operational data. The technique 1300 can be executed using computing devices, such as the systems, hardware, and software described with respect to FIGS. 1-11D. The technique 1300 can be performed, for example, by executing a machine-readable program or other computer-executable instructions, such as routines, instructions, programs, or other code. The steps, or operations, of the technique 1200, or another technique, method, process, or algorithm described in connection with the implementations disclosed herein can be implemented directly in hardware, firmware, software executed by hardware, circuitry, or a combination thereof.

At 1302, operational data generated by operations of a computer system is received. The operational data may take various forms, including system logs generated for debugging or monitoring, message queue payloads, client-side memory logs containing debugging information, and server-side multimedia router logs. In some implementations, the operational data may be derived from source code that generates the operational data during operation. The tech-

26 nique 1300 may additionally receive configuration parameters that define rules for analyzing new types of operational data formats.

At 1304, the operational data is analyzed to identify data structures within the operational data. This analysis may involve selecting a parsing rule set based on a schema type indicator, where the parsing rule set defines how to extract data elements from the operational data. For source code analysis, this includes analyzing log message implementations to identify data elements generated during execution. The analysis may also involve parsing comma-separated values within log messages to identify data fields and their relationships. During this process, the technique 1300 can automatically suggest matches between identified data elements and pre-approved terms in a data dictionary.

At 1306, based on the identified data structures, a schema definition is generated in a standardized format. This generation process includes creating definitions of tables and fields that represent the data structures and converting the operational data into a standardized JSON format. Fields in the schema definition are mapped to standardized terms in a centralized dictionary, where each standardized term is associated with a sensitivity classification.

At 1308, the schema definition is integrated into the MMS. This integration may include submitting the schema definition to a governance workflow for classification and approval, during which users can edit the schema definition through a provided user interface; submitting the schema definition to privacy reviewers for classification of data sensitivity levels; and linking the schema definition to a data dictionary containing approved data terms. The integration process enables access control policies based on classified data sensitivity levels and can block deployment of source code if any classified data sensitivity levels exceed a predetermined threshold.

For simplicity of explanation, the techniques 1200 and 1300 of FIGS. 12 and 13, respectively, is each depicted and described herein as a respective series of steps or operations. However, the steps or operations of the techniques 1200 and 1300 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Some implementations are described below as numbered examples (Example 1, 2, 3, etc.). These examples are provided as examples only and do not limit the other implementations disclosed herein.

Example 1 is a method that includes receiving operational data generated by operations of a computer system; analyzing the operational data to identify data structures within the operational data; generating, based on the data structures, a schema definition that represents the operational data in a standardized format; and integrating the schema definition into the metadata management service.

Example 2 is the method of Example 1 that includes selecting, based on a schema type indicator, a parsing rule set, wherein the parsing rule set defines how to extract data elements from the operational data; and applying the parsing rule set to the operational data to generate the schema definition.

Example 3 is the method of Example 1 that includes mapping a field in the schema definition to a standardized term in a centralized dictionary.

Example 4 is the method of Example 3 that includes the standardized term being associated with a sensitivity classification.

Example 5 is the method of Example 1 that includes submitting the schema definition to a governance work-flow for classification and approval; and upon receiving approval via the governance workflow, integrating the schema definition into the metadata management service.

Example 6 is the method of Example 5 that includes providing a user interface for editing the schema definition before submission to the governance workflow.

Example 7 is the method of Example 1 that includes the operational data comprising one of system logs generated for debugging or monitoring, message queue payloads, client-side memory logs containing debugging information, or server-side multimedia router logs.

Example 8 is a system that includes a memory subsystem; and processing circuitry, the processing circuitry configured to execute instructions of a metadata management service and stored in the memory subsystem to receive operational data generated by operations of a computer system; analyze the operational data to identify data structures within the operational data; generate, based on the data structures, a schema definition that represents the operational data in a standardized format; and integrate the schema definition into the metadata management service.

Example 9 is the system of Example 8 that includes instructions to receive source code that generates the operational data during their operation.

Example 10 is the system of Example 8 that includes instructions to analyze log message implementations within source code to identify data elements generated during execution.

Example 11 is the system of Example 8 that includes instructions to parse comma-separated values within log messages to identify data fields and their relationships.

Example 12 is the system of Example 8 that includes instructions to generate definitions of tables and fields that represent the data structures.

Example 13 is the system of Example 8 that includes instructions to convert the operational data into a standardized JSON format.

Example 14 is the system of Example 8 that includes processing circuitry further configured to execute instructions stored in the memory subsystem to receive configuration parameters that define rules for analyzing new types of operational data formats.

Example 15 is the system of Example 8 that includes processing circuitry further configured to execute instructions stored in the memory subsystem to submit the schema definition to a privacy reviewer for classification of data sensitivity levels.

Example 16 is one or more non-transitory computer readable media storing instructions operable to cause one or more processors to perform operations of a metadata management service, the operations including receiving operational data generated by operations of a computer system; analyzing the operational data to identify data structures within the operational data; generating, based on the data structures, a schema definition that represents the operational data in a standardized format; and integrating the schema definition into the metadata management service.

Example 17 is the one or more non-transitory computer readable media of Example 16 that includes operations to block deployment of source code that generates the operational data if any classified data sensitivity levels exceed a predetermined threshold.

Example 18 is the one or more non-transitory computer readable media of Example 16 that includes operations to apply access control policies based on classified data sensitivity levels.

Example 19 is the one or more non-transitory computer readable media of Example 16 that includes operations to link the schema definition to a data dictionary containing approved data terms.

Example 20 is the one or more non-transitory computer readable media of Example 16 that includes operations to automatically suggest matches between data elements in the schema definition and pre-approved terms in a data dictionary.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method implemented by a metadata management service, comprising:

receiving operational data generated by operations of a computer system;

analyzing the operational data to identify data structures within the operational data;

generating, based on the data structures, a schema definition that represents the operational data in a standardized format;

integrating the schema definition into the metadata management service;

receiving, via a continuous integration/continuous deployment (CI/CD) pipeline, source code for deployment to a production environment, wherein the source code contains operational data structures;

identifying, based on a mapping between source code components and approved schemas, data elements in the operational data structures that correspond to the schema definition;

determining, based on the schema definition, whether any classified data sensitivity levels associated with the identified data elements exceed a predetermined threshold; and responsive to determining that the classified data sensitivity levels exceed the predetermined threshold, blocking the deployment of the source code to the production environment.

2. The method of claim 1, wherein analyzing the operational data to identify the data structures within the operational data comprises:

selecting, based on a schema type indicator, a parsing rule set, wherein the parsing rule set defines how to extract data elements from the operational data; and applying the parsing rule set to the operational data to generate the schema definition.

3. The method of claim 1, further comprising:

mapping a field in the schema definition to a standardized term in a centralized dictionary.

4. The method of claim 3, wherein the standardized term is associated with a sensitivity classification.

5. The method of claim 1, wherein integrating the schema definition into the metadata management service comprises:

submitting the schema definition to a governance workflow for classification and approval; and upon receiving the approval via the governance workflow, integrating the schema definition into the metadata management service.

6. The method of claim 5, further comprising:

providing a user interface for editing the schema definition before submission to the governance workflow.

7. The method of claim 1, wherein the operational data comprises one of system logs generated for debugging or monitoring, message queue payloads, client-side memory logs containing debugging information, or server-side multimedia router logs.

8. The method of claim 1, wherein analyzing the operational data to identify the data structures within the operational data comprises:

extracting implicit data structures from unstructured or semi-structured operational data, wherein the implicit data structures comprise log message definitions or telemetry collection mechanisms within the source code; and converting the implicit data structures into definitions of tables and fields that represent the data structures.

9. A system, comprising:

a memory subsystem; and processing circuitry, the processing circuitry configured to execute instructions of a metadata management service and stored in the memory subsystem to:

receive operational data generated by operations of a computer system;

analyze the operational data to identify data structures within the operational data;

generate, based on the data structures, a schema definition that represents the operational data in a standardized format;

integrate the schema definition into the metadata management service;

receive, via a continuous integration/continuous deployment (CI/CD) pipeline, source code for deployment to a production environment, wherein the source code contains operational data structures;

identify, based on a mapping between source code components and approved schemas, data elements in the operational data structures that correspond to the schema definition;

determine, based on the schema definition, whether any classified data sensitivity levels associated with the identified data elements exceed a predetermined threshold; and responsive to determining that the classified data sensitivity levels exceed the predetermined threshold, block the deployment of the source code to the production environment.

10. The system of claim 9, wherein the instructions to receive the operational data comprise instructions to:

receive source code that generates the operational data during their operation.

11. The system of claim 9, wherein the instructions to analyze the operational data comprise instructions to:

analyze log message implementations within source code to identify data elements generated during execution.

12. The system of claim 9, wherein the instructions to analyze the operational data comprise instructions to:

parse comma-separated values within log messages to identify data fields and their relationships.

13. The system of claim 9, wherein the instructions to generate the schema definition comprise instructions to:

generate definitions of tables and fields that represent the data structures.

14. The system of claim 9, wherein the instructions to generate the schema definition comprise instructions to:

convert the operational data into a standardized JSON format.

15. The system of claim 9, wherein the processing circuitry is further configured to execute instructions stored in the memory subsystem to:

receive configuration parameters that define rules for analyzing new types of operational data formats.

16. The system of claim 9, wherein the processing circuitry is further configured to execute instructions stored in the memory subsystem to:

submit the schema definition to a privacy reviewer for classification of data sensitivity levels.

17. One or more non-transitory computer readable media storing instructions operable to cause one or more processors to perform operations of a metadata management service, the operations comprising:

receiving operational data generated by operations of a computer system;

analyzing the operational data to identify data structures within the operational data;

generating, based on the data structures, a schema definition that represents the operational data in a standardized format;

integrating the schema definition into the metadata management service;

receiving, via a continuous integration/continuous deployment (CI/CD) pipeline, source code for deployment to a production environment, wherein the source code contains operational data structures;

identifying, based on a mapping between source code components and approved schemas, data elements in the operational data structures that correspond to the schema definition;

determining, based on the schema definition, whether any classified data sensitivity levels associated with the identified data elements exceed a predetermined threshold; and responsive to determining that the classified data sensitivity levels exceed the predetermined threshold, blocking the deployment of the source code to the production environment.

18. The one or more non-transitory computer readable media of claim 17, wherein integrating the schema definition comprises:

applying access control policies based on classified data sensitivity levels.

19. The one or more non-transitory computer readable media of claim 17, wherein integrating the schema definition comprises:

linking the schema definition to a data dictionary containing approved data terms.

20. The one or more non-transitory computer readable media of claim 17, the operations further comprising:

automatically suggesting matches between data elements in the schema definition and pre-approved terms in a data dictionary.

\* \* \* \* \*